United States Patent
Kim et al.

(10) Patent No.: US 6,959,114 B2
(45) Date of Patent: Oct. 25, 2005

(54) ENCODING METHOD AND APPARATUS OF DEFORMATION INFORMATION OF 3D OBJECT

(75) Inventors: Sung-jin Kim, Kyungki-do (KR); Shin-jun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 628 days.

(21) Appl. No.: 10/080,655

(22) Filed: Feb. 25, 2002

(65) Prior Publication Data

US 2003/0142098 A1 Jul. 31, 2003

(30) Foreign Application Priority Data

Feb. 28, 2001 (KR) ........................................ 2001-10603
Jul. 7, 2001 (KR) ........................................ 2001-40708

(51) Int. Cl.[7] .............................................. G06K 9/72
(52) U.S. Cl. ................................. 382/232; 375/240.03
(58) Field of Search ................................. 382/100, 154, 382/232, 233, 2.38, 240, 241, 247, 251; 345/418, 419, 420, 428, 473, 474, 475, 423, 555, 646; 348/348.1–440.1; 358/426.01–426.16; 375/122, 240.01–240.29; 708/203

(56) References Cited

U.S. PATENT DOCUMENTS

| | | | |
|---|---|---|---|
| 5,793,371 A | * 8/1998 | Deering | 345/418 |
| 5,818,463 A | * 10/1998 | Tao et al. | 345/473 |
| 5,929,860 A | * 7/1999 | Hoppe | 345/419 |
| 6,151,033 A | * 11/2000 | Mihara et al. | 345/475 |
| 6,262,737 B1 | * 7/2001 | Li et al. | 345/419 |
| 6,614,428 B1 | * 9/2003 | Lengyel | 345/420 |

OTHER PUBLICATIONS

Bourges–Sevenier, M., et al., *Animation Framework for MPEG–4 Systems*, Multimedia and Expo, 2000 IEEE International Conference, Jul. 2000, pp. 1115–1118.
Lengyel, J., *Compression of Time–Dependent Geometry*, Proceedings of the 1999 Symposium on Interactive 3D Graphics, Apr. 1999, pp. 89–95.
Jang, E., *3D Animation Coding: its History and Framework*, Multimedia and Expo, 2000 IEEE International Conference, Jul. 2000, pp. 1119–1122.
Mitra, T., *A Breadth–First Approach to Efficient Mesh Traversal*, Proceedings of the 1998 Eurographics/Siggraph Workshop on Graphics Hardware, Aug. 1998, pp. 31–38.
Taubin, G., et al., *Geometry Coding and VRML*, Proceedings of the IEEE, vol. 86, No. 6, Jun. 1998, pp. 1228–1243.

* cited by examiner

*Primary Examiner*—Samir Ahmed
(74) *Attorney, Agent, or Firm*—Buchanan Ingersoll PC

(57) ABSTRACT

An encoding method and apparatus of deformation information of a 3-dimensional (3D) object are provided. The encoding method of deformation information of a 3-Dimensional (3D) object, in which information on vertices forming the shape of the 3D object is described by a key framing method for performing deformation of the 3D object, the encoding method includes: (a) extracting keys indicating positions of key frames on a time axis, key values indicating characteristics information of key frames, and relation information, by parsing node information of the 3D object; (b) generating vertex connectivity information from the related information; (c) generating differential values for each of the keys from which temporal data redundancy is to be removed, and key values from which spatiotemporal data redundancy is to be removed, based on the vertex connectivity information; (d) quantizing the differential values; and (e) removing redundancy among bits and generating compressed bit stream through entropy encoding.

49 Claims, 21 Drawing Sheets

SEARCHING ORDER : V1 → V2 → V3 → V4 → V5 → V6 → V7 → V8

ENCODING METHOD AND APPARATUS OF DEFORMATION INFORMATION OF 3D OBJECT

Priority is claimed to Patent Application Numbers 2001-10603 filed in the Republic of Korea on Feb. 28, 2001 and 2001-40708 filed in the Republic of Korea on Jul. 7, 2001, herein incorporated by reference.

BACKGROUND OF THE INVENTION

1. Field of the Invention

The present invention relates to data compression, and more particularly, to an encoding method and apparatus of deformation information of a 3-dimensional (3D) object.

2. Description of the Related Art 3-dimensional (3D) presentation is known, for example, to be utilized in computer games or virtual reality world environments in a computer system. In the case of 3D models, a Virtual Reality Modeling Language (VRML) has been the primary means for expressing 3D objects.

In VRML, a 3D object is expressed in the form of a polygonal mesh, and animation of the object is accomplished by a linear key framing method. In this animation method, a predetermined key frame is set on an arbitrary time axis, and animation data between each key frame is interpolated by a linear interpolation method. A key frame used in this method is defined by an interpolator node, which is formed of field data, expressed as key data indicating the position of the key frame on a time axis, and key value data indicating attribute information of the key frame at a corresponding key.

Meanwhile, when smooth animation similar to an actual moving body is expressed by the key framing method having the characteristic of piecewise liner interpolation, a large amount of key frame information should be provided through interpolator nodes, which causes a serious problem in cost and efficiency. When the key framing method is used off-line, a large capacity storage apparatus is needed to store the huge amount of 3D animation data. When the key framing method is used on-line, in addition to the large capacity storage apparatus, transmission of 3D animation data from a server to terminals requires very high speed and large capacity transmission routes, and data reliability is lowered in line with the increasing probability of transmission error. Therefore, an efficient compressing and encoding method is needed in order to reduce the amount of interpolator node data.

For this, a Differential Pulse Code Modulation (DPCM) encoding method is used as shown in FIG. 1. In the DPCM method, only the difference value of data is encoded so that the number of bits decreases. The DPCM method is used in compressing data coupled with the key framing method. Also, the DPCM method is used in the MPEG-4 Binary Format for Scene (BIFS).

Referring to FIG. 1, a parser 105 identifies data information of an interpolator node to be encoded. A demultiplexer 110 classifies field data of the interpolator node to be encoded among interpolator nodes. More specifically, the demultiplexer receives a Coordinate Interpolator (CI) node from the parser 105, and outputs field data formed of a key ($Q^K$) and key values ($Q^{KV}$) corresponding to the node. A DPCM processor 120 receives field data of the CI node, divides the key and key values, and removes temporal redundancy among data, by generating each differential value ($E^K$, $E^{KV}$) of neighboring keys and key value data.

FIG. 2 is a detailed diagram of the DPCM processor of FIG. 1. Referring to FIG. 2, when a differential value of a value to be encoded at present is generated, an inverse quantizer 122 makes the previous data on the time axis the same as a value reconstructed in a decoding apparatus 150. Referring to FIG. 1 again, a quantizer 130 receives thus generated differential values ($E^K$, $E^{KV}$), and adjusts the expression precision degree of data to be encoded so as to provide data compression effects. An entropy encoder 135 receives values ( ) quantized in the quantizer 130, removes redundancy among bits with respect to the probability of symbol occurrence, and generates a compressed bit stream 140. The bit stream 140 generated by the encoding apparatus 100 of FIG. 1 is reconstructed to the CI node, which was encoded, by the decoding apparatus 150 which performs the inverse of the process performed by the encoding apparatus 100.

However, in removing data redundancy existing in the field data of the interpolator node, the encoding apparatus 100 and decoding apparatus 150 having the above-described structures only removes data redundancy with respect to spatial correlation of vertices forming the shape of the 3D object. Thus, data redundancy with respect to temporal correlation, which occurs greatly in the key framing type animation, is not considered at all, and therefore it is difficult to improve the actual compression effect.

SUMMARY OF THE INVENTION

To solve the above problems, it is a first objective of the present invention to provide an encoding method and apparatus for removing data redundancy using spatiotemporal data correlation in encoding, with respect to time, deformation information of a 3D object to be encoded.

It is a second objective of the present invention to provide an encoding method and apparatus for generating a start vertex used for generating BFS information in response to connectivity information of vertices, with respect to time, deformation information of a 3D object to be encoded.

It is a third objective of the present invention to provide an encoding method and apparatus for compensating for quantization error in encoding, with respect to time, deformation information of a 3D object to be encoded.

To accomplish the objective of the present invention, there is provided an encoding method of deformation information of a 3-Dimensional (3D) object, in which information on vertices forming the shape of the 3D object is described by a key framing method for performing deformation of the 3D object, the encoding method includes (a) extracting keys indicating positions of key frames on a time axis, key values indicating characteristics information of key frames, and relation information, by parsing node information of the 3D object; (b) generating vertex connectivity information from the related information; (c) generating differential values for each of the keys from which temporal data redundancy is to be removed, and key values from which spatiotemporal data redundancy is to be removed, based on the vertex connectivity information; (d) quantizing the differential values; and (e) removing redundancy among bits and generating compressed bit stream through entropy encoding by receiving the quantized keys and key values.

To accomplish another objective of the present invention, there is provided an encoding method of deformation information of a 3-Dimensional (3D) object, in which information on vertices forming the shape of the 3D object is described by a key framing method for performing deformation of the 3D object, the encoding method includes (a)

extracting keys indicating position of key frames on a time axis, key values indicating characteristics information of key frames, and relation information, by parsing node information of the 3D object; (b) generating vertex connectivity information from the related information; (c) quantizing the keys and key values; (d) generating differential values of each of keys of which temporal data redundancy is to be removed, and quantized key values of which spatiotemporal data redundancy is to be removed, based on the vertex connectivity information; and (e) removing redundancy among bits and generating compressed bit stream through entropy encoding, by receiving the differential values.

To accomplish another objective of the present invention, there is provided an encoding method of deformation information of a 3-Dimensional (3D) object, in which information on vertices forming the shape of the 3D object is described by a key framing method for performing deformation of the 3D object, the encoding method includes (a) extracting keys indicating position of key frames on a time axis, key values indicating characteristics information of key frames, and relation information, by parsing node information of the 3D object; (b) generating search start information of a Breadth First Search (BFS) for defining spatial data correlation among vertices of the 3D object; (c) generating vertex connectivity information from the related information extracted in step (a) and the search start information generated in step (b); (d) generating differential values of each key from which temporal data redundancy is to be removed, and key values from which spatiotemporal data redundancy is to be removed, based on the vertex connectivity information; (e) quantizing the differential values; (f) receiving the quantized keys and key values, and generating the quantization steps of encoding bits of the key values; and (g) receiving the quantization steps of encoding bits and removing redundancy among bits in the quantized values and generating compressed bit stream through entropy encoding, by receiving the quantized keys and key values.

To accomplish another objective of the present invention, there is provided an encoding method of deformation information of a 3-Dimensional (3D) object, in which information on vertices forming the shape of the 3D object is described by a key framing method for performing deformation of the 3D object, the encoding method includes (a) extracting keys indicating position of key frames on a time axis, key values indicating characteristics information of key frames, and relation information, by parsing node information of the 3D object; (b) generating search start information of a Breadth First Search (BFS) for defining spatial data correlation among vertices of the 3D object; (c) generating vertex connectivity information from the related information extracted in step (a) and the search start information generated in step (b); (d) quantizing the keys and key values; (e) generating differential values of each of quantized keys of which temporal data redundancy is to be removed, and quantized key values of which spatiotemporal data redundancy is to be removed, based on the vertex connectivity information; (f) receiving the differential values and generating the quantization steps of encoding bits of the key values; and (g) receiving the quantization steps of encoding bits and removing redundancy among bits in the quantized values and generating compressed bit stream through entropy encoding. To accomplish another objective of the present invention, there is provided an encoding apparatus of deformation information of a 3-Dimensional (3D) object, in which information on vertices forming the shape of the 3D object is described by a key framing method for performing deformation of the 3D object, the encoding apparatus has a field data input unit for extracting keys indicating position of key frames on a time axis, key values indicating characteristics information of key frames, and relation information, by parsing node information of the 3D object; a vertex connectivity processing unit for generating vertex connectivity information from the related information; an Adaptive Differential Pulse Code Modulation (ADPCM) processing unit for generating differential values for each of the keys from which temporal data redundancy is to be removed, and key values from which spatiotemporal data redundancy is to be removed, based on the related information and the vertex connectivity information; a quantization unit for quantizing the differential values and outputting the quantized values; and an entropy encoding unit for receiving the quantized keys and key values and removing redundancy among bits.

To accomplish another objective of the present invention, there is provided an encoding apparatus of deformation information of a 3-Dimensional (3D) object, in which information on vertices forming the shape of the 3D object is described by a key framing method for performing deformation of the 3D object, the encoding apparatus has a field data input unit for extracting keys indicating position of key frames on a time axis, key values indicating characteristics information of key frames, and relation information, by parsing node information of the 3D object; a quantization unit for quantizing the keys and key values; an Adaptive Differential Pulse Code Modulation (ADPCM) processing unit for generating differential values of the quantized keys from which temporal data redundancy is to be removed, and differential values of the quantized key values from which spatiotemporal data redundancy is to be removed, based on the related information and the vertex connectivity information; an entropy encoding unit for removing redundancy among bits.

BRIEF DESCRIPTION OF THE DRAWINGS

The above objects and advantages of the present invention will become more apparent by describing in detail preferred embodiments thereof with reference to the attached drawings in which:

FIG. 12 is a schematic block diagram of an encoding apparatus and decoding apparatus according to a second preferred embodiment of the present invention, in which quantization error is compensated for;

FIG. 16 is a block diagram of a preferred embodiment of a DPCM processor of FIG. 14, in which quantization error is compensated for;

FIG. 18 is a block diagram of an encoding apparatus and decoding apparatus according to a fourth preferred embodiment of the present invention, in which quantization error is compensated for;

DESCRIPTION OF THE PREFERRED EMBODIMENTS

Figure 11:
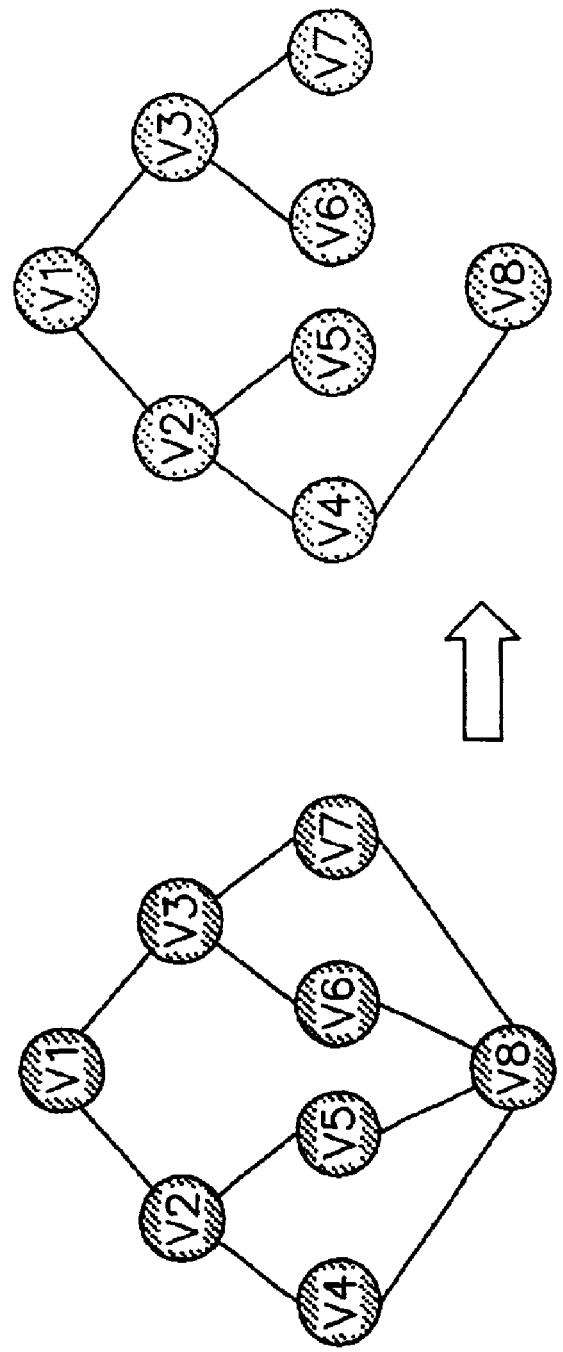
FIG. 11 is a diagram of an example of the structure of a Breadth First Search (BFS) graph.

In encoding, with respect to time, deformation information of a 3D object to be encoded, data redundancy is removed by using spatiotemporal correlation. Here, the spatiotemporal correlation is obtained by defining the connectivity of vertices forming the shape of the 3D object. The connectivity is defined using a Breadth First Search (BFS) method, as shown in FIG. 11. Also, temporal data correlation is defined by a method for reconstructing characteristic values of the degree of change of key values on a time axis, which are defined by a key according to the key frame method having the piecewise linear interpolation characteristic, with respect to correlation among vertices defined by the BFS. In beginning a BFS in the present invention, a start vertex (Start) which enables more efficient encoding is searched for, and using the search start vertex, a more efficient BFS graph is generated. Thus, the key values of a CI node are efficiently encoded. In addition, in the present invention, by preventing accumulation of quantization errors in vertices, excluding a corresponding vertex, during decoding of a 3D object, split reconstruction of each part of the object is prevented. Therefore, in a 3D object which is expressed as a polygonal mesh or a parametric mesh, a huge amount of key value information of 3D graphic animation data which is provided as deformation information of the 3D object with the lapse of time can be efficiently compressed, encoded, and decoded.

Figure 1:
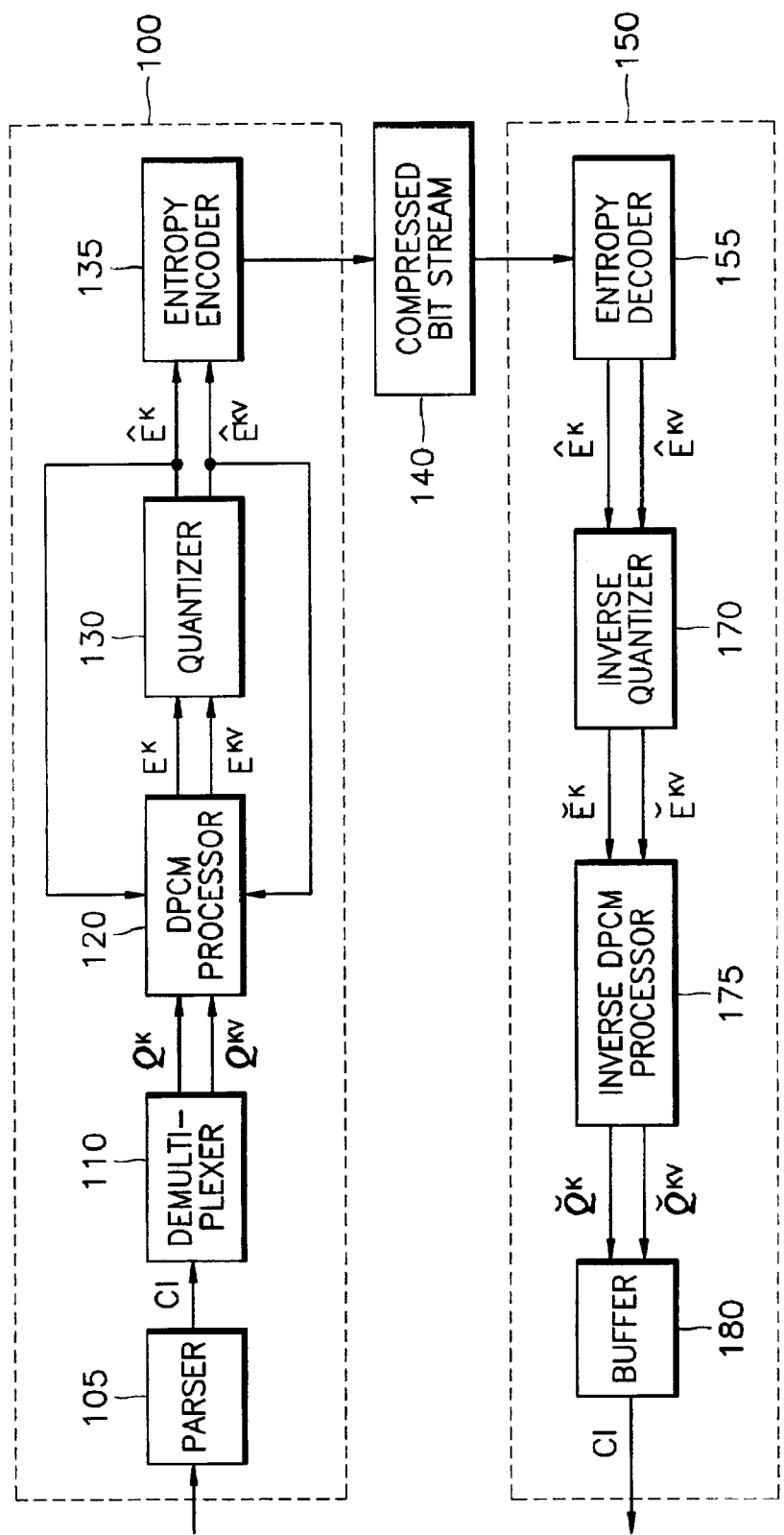
FIG. 1 is a block diagram of an encoding apparatus and decoding apparatus to which Delta Pulse Code Modulation (DPCM) is applied.
Figure 2:
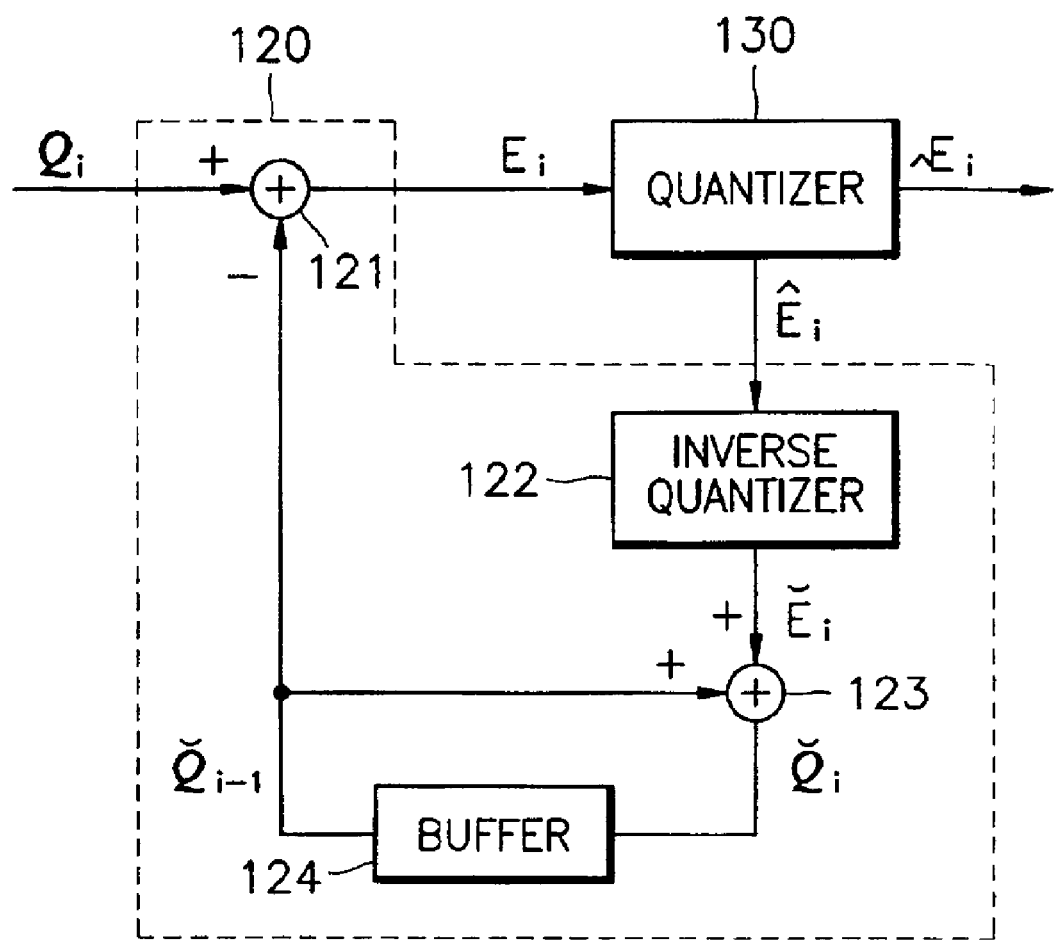
FIG. 2 is a detailed diagram of a DPCM processor of FIG. 1.
Figure 3:
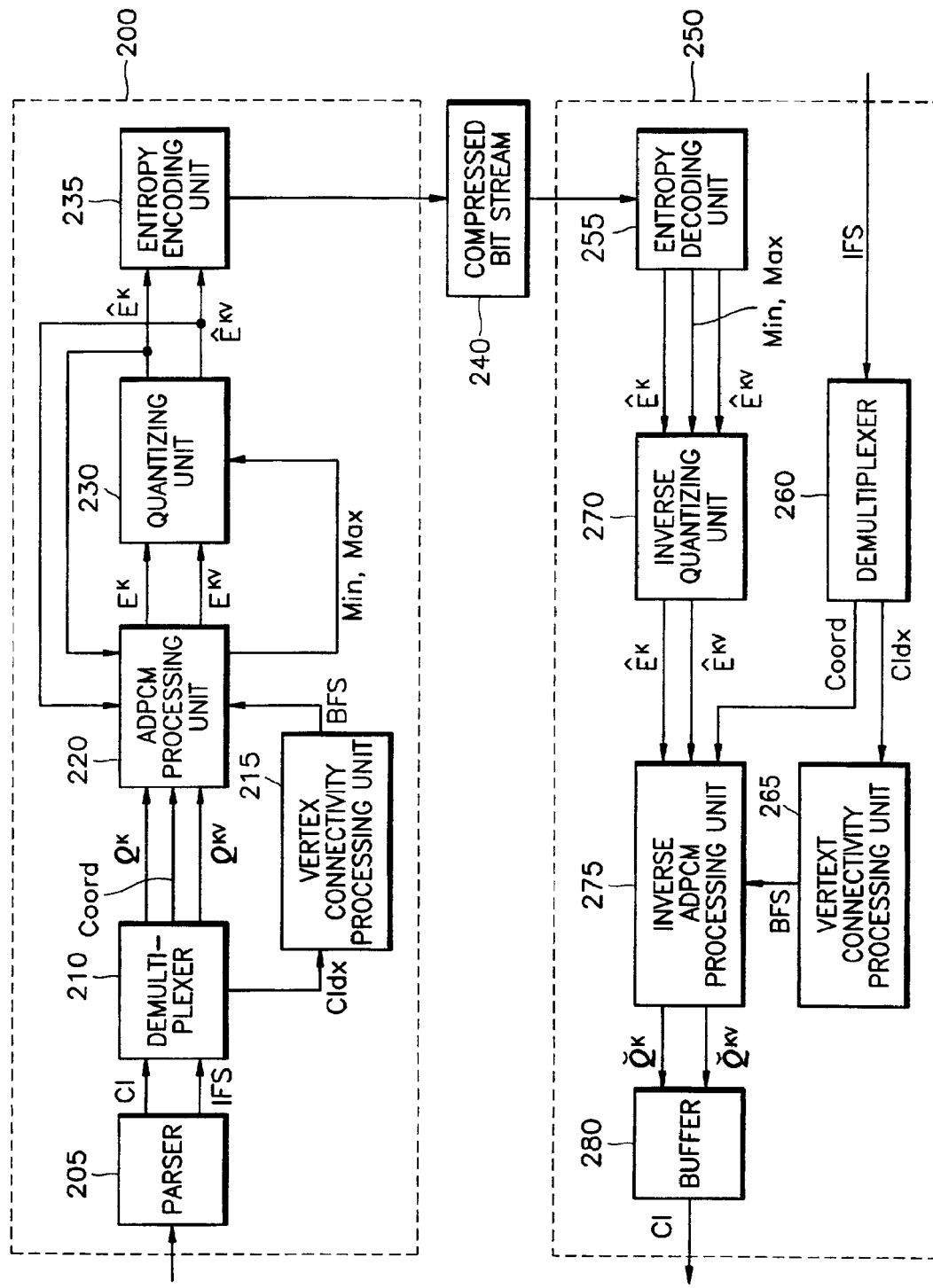
FIG. 3 is a schematic block diagram of an encoding apparatus and decoding apparatus according to a first preferred embodiment of the present invention, which considers spatiotemporal data correlation.
Figure 12:
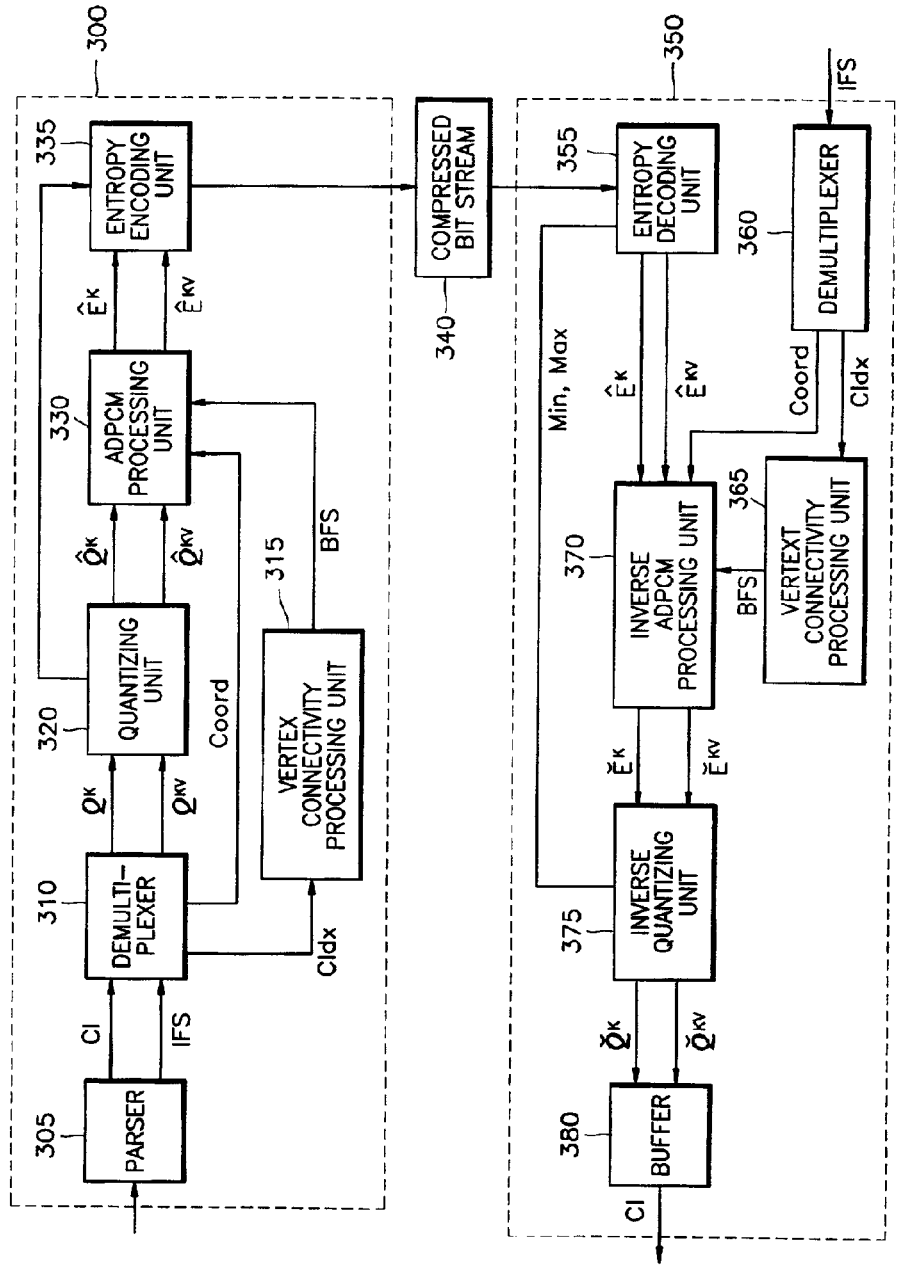
Figure 17:
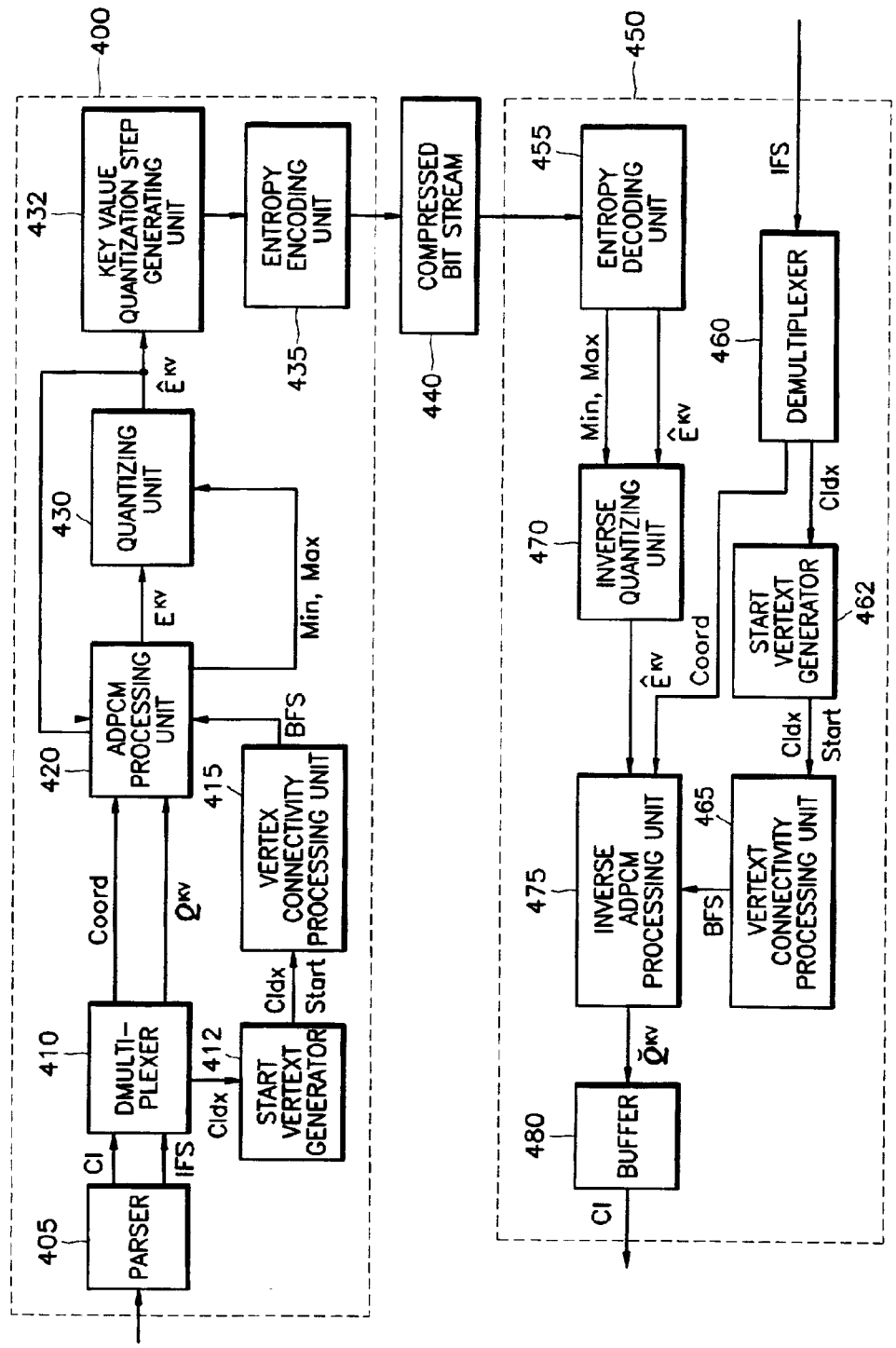
FIG. 17 is a block diagram of an encoding apparatus and decoding apparatus according to a third preferred embodiment of the present invention, having a function for generating a start node.
Figure 18:
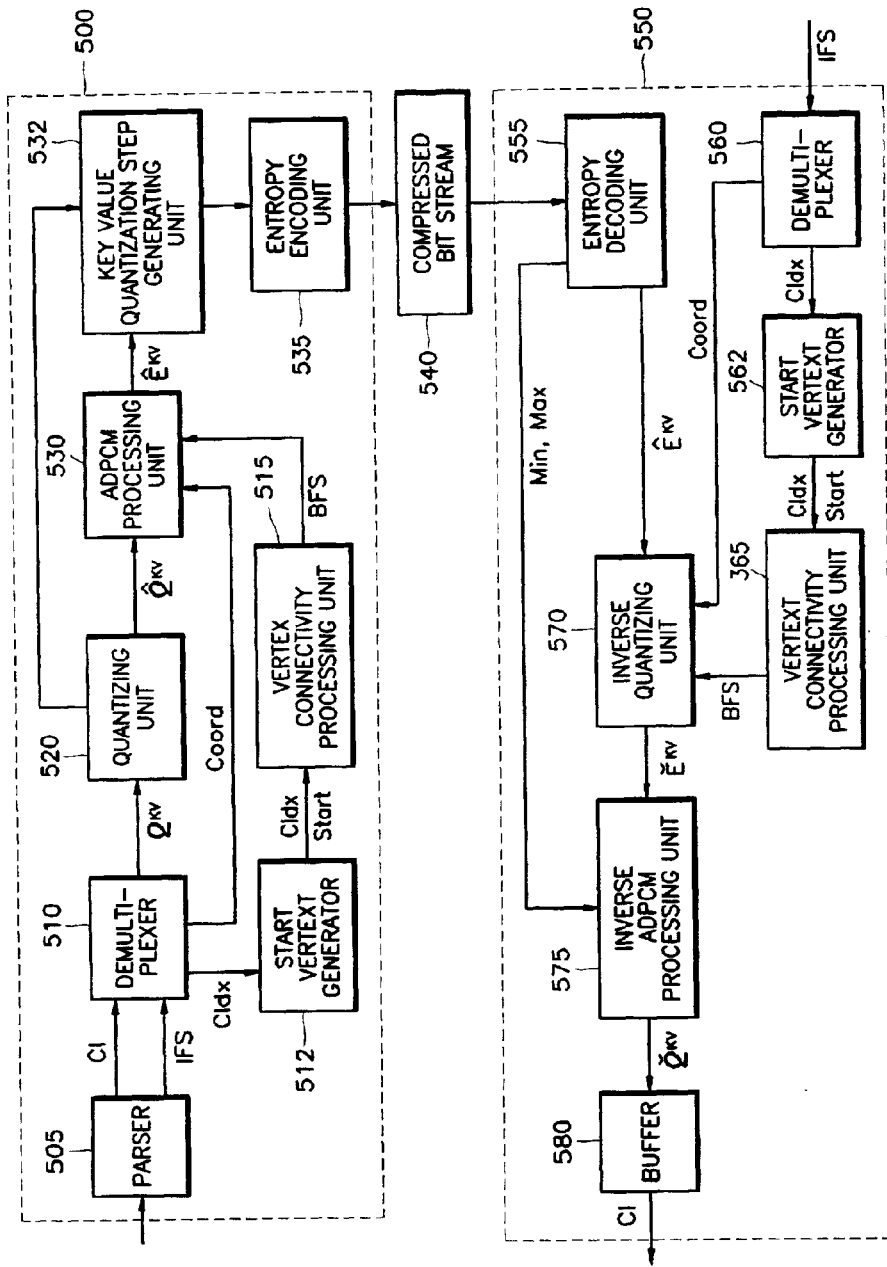

The entire structures of encoding and decoding apparatuses according to a first preferred embodiment and a second preferred embodiment of the present invention are shown in FIGS. 3 and 12, respectively. The entire structures of encoding and decoding apparatuses according to a third preferred embodiment and a fourth preferred embodiment of the present invention are shown in FIGS. 17 and 18, respectively. As will be explained later, functional characteristics between the two systems of FIGS. 3 and 12, or between two systems of FIGS. 17 and 18 are found in the methods of expressing a 3D shape and the locations of quantization units.

Figure 4:
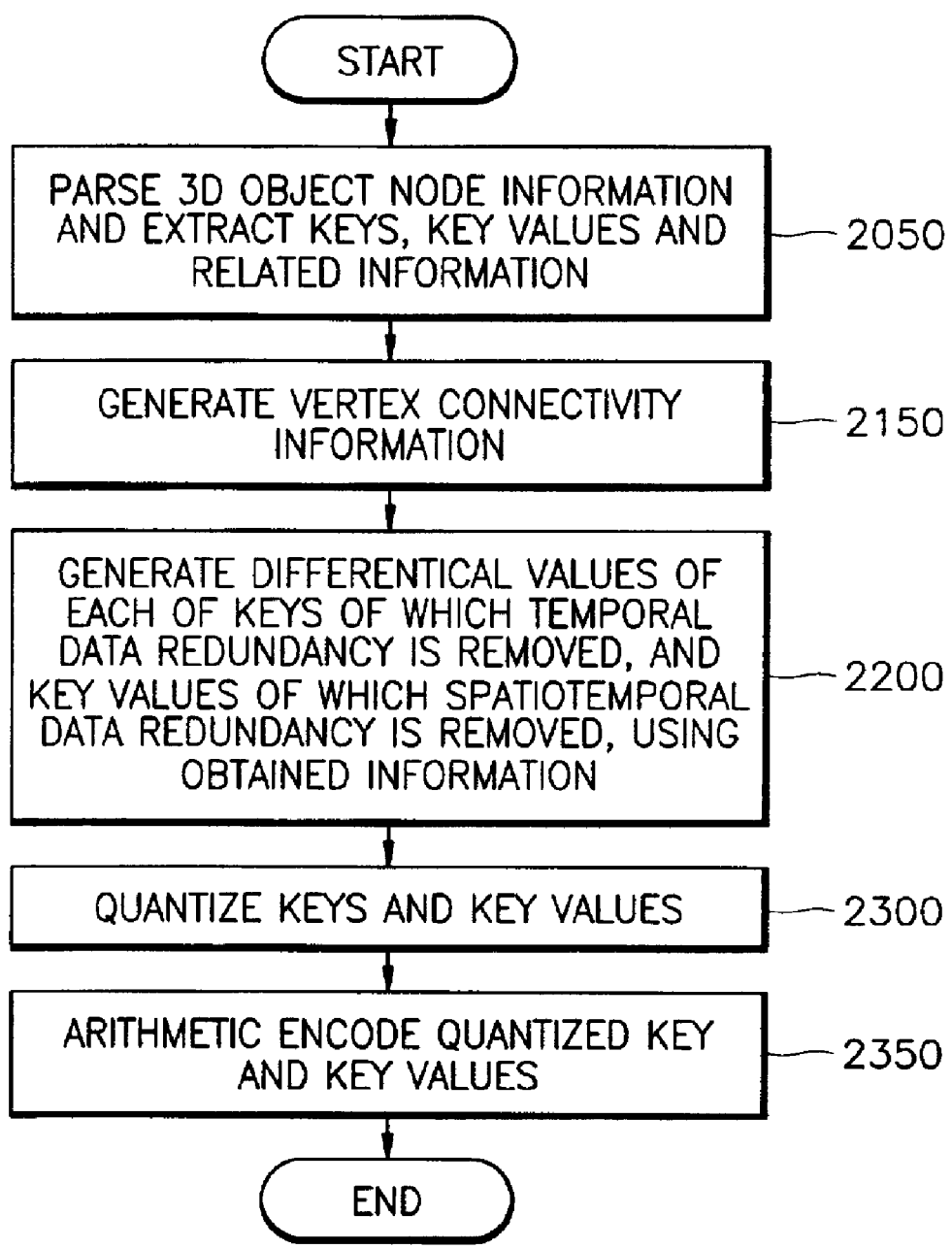
FIG. 4 is a flowchart of an encoding method of the encoding apparatus of FIG. 3.

FIG. 3 is a schematic block diagram of an encoding apparatus and decoding apparatus according to a first preferred embodiment of the present invention, which considers spatiotemporal data correlation, and FIG. 4 is a flowchart for explaining the encoding method of the encoding apparatus of FIG. 3.

Referring to FIGS. 3 and 4, a encoding apparatus 200 of the first preferred embodiment of the present invention includes a parser 205, a demultiplexer 210, a vertex connectivity processing unit 215, an Adaptive Differential Pulse Code Modulation (ADPCM) processing unit 220, a quantization unit 230, and an entropy encoding unit 235. To perform the inverse of the encoding process, a decoding apparatus 250 includes an entropy decoding unit 255, a demultiplexer 260, a vertex connectivity processing unit 265, an inverse quantization unit 270, an inverse ADPCM processing unit 275, and a buffer 280. Here, the decoding apparatus 250 performs the inverse of the encoding process performed in the encoding apparatus 200. Therefore, for brevity only the encoding operation of the encoding apparatus 200 will be explained.

First, the encoding apparatus 200 parses node information on a 3D object by the parser 205, and extracts keys, key values, and related information in step 2050. The parser 205 classifies Coordinate Interpolator (CI) nodes and IndexedFaceSet (IFS) nodes, by parsing node information of a 3D object to be encoded. In the present invention, encoding the CI nodes is considered. The CI nodes are used to provide a function of deformation, such as morphing, to vertex information of a 3D object. The demultiplexer 210 receives the separated CI nodes and IFS nodes, and provides them to the vertex connectivity processing unit 215 and the ADPCM processing unit 220. Here, the IFS nodes are provided as information to be referred to for generating differential information of the first key frame of the CI node. By doing so, the amount of data of a key frame defined at the first key position of each CI node is efficiently reduced because CI nodes and IFS nodes have a 1:1 correspondence.

In order to generate connectivity information among vertices, the vertex connectivity processing unit 215 receives CoordIdx (CIdx) field data of an IFS node from the demultiplexer 210 and forms BFS information in step 2150. BFS information is used in defining spatial correlation among vertices in the ADPCM processing unit 220.

As shown in FIG. 11, BFS information redefines form information of a 3D object having a polygonal mesh structure as that of a BFS-type graph structure. BFS information forms all vertices adjacent to an arbitrary vertex into children nodes so as to express spatial data correlation. Thus defined spatial data correlation can be used in efficiently removing data redundancy in encoding using the characteristic that neighboring vertices in a 3D space have similar motion vectors, when a 3D object is deformed on a time axis.

The ADPCM processing unit 220 receives BFS information generated in the vertex connectivity processing unit

215, keys ($Q^K$) and key values ($Q^{KV}$) corresponding to a CI node, and a Coordinate (Coord) of an IFS node from the demultiplexer 210. Then, the ADPCM processing unit 220 generates each differential value ($E^K$, $E^{KV}$) of keys, from which temporal data redundancy is removed, and key values, from which spatiotemporal data redundancy is removed in step 2200.

Thus, position values of vertices to be encoded in the encoding apparatus 200 are converted to differential values in order to remove spatiotemporal data redundancy, and input to the quantization unit 230. The quantization unit 230 adjusts the expression precision degree of key value data with respect to quantization size values so as to provide actual data compression effects in step 2300. Quantized result values ($Q^K$, $Q^{KV}$) are input to both the ADPCM processing unit 220 and the entropy encoding unit 235. The entropy encoding unit 235 removes bit redundancy in the quantized values, using the probability of bit symbol occurrence, and generates a final bit stream 240 in step 2350.

In this encoding process, if the differential values of the key values before quantization are quantized and then reconstructed, position changes among each reconstructed vertex may occur due to quantization error. Therefore, each part of a 3D object may be reconstructed to a shape in which each part is split from the other parts. This split reconstruction can be prevented by encoding differential values of quantized values as shown in FIG. 12.

Figure 5:
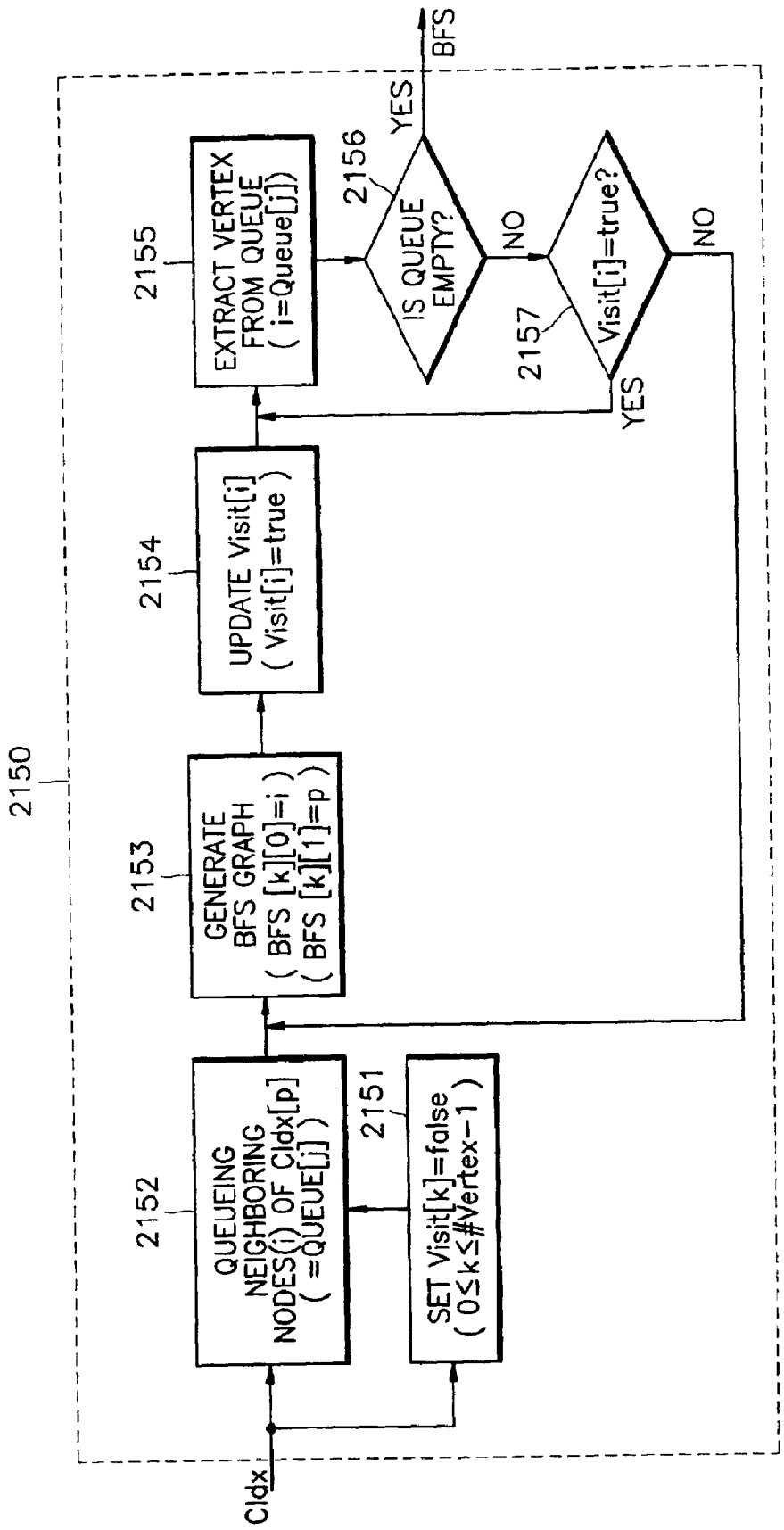
FIG. 5 illustrates a method for forming BFS graph of a vertex connectivity processing unit of FIG. 3.

FIG. 5 illustrates a processing process according to a preferred embodiment of a vertex connectivity processing unit of FIG. 3. Referring to FIG. 5, the vertex connectivity processing unit 215 receives CIdx information indicating the shape of the mesh structure, stores CIdx information in a queue in step 2152, and generates a BFS graph based on whether or not each vertex is visited through the queue in step 2153. At this time, in order to generate final BFS information, the vertex connectivity processing unit 125 manage the queue in step 2155, and information on whether or not each vertex is visited through the queue in steps 2151 and 2154. Here, according to the BFS search order, a vertex which is first visited is defined as −1 as a top vertex. Thus, a BFS graph as shown in FIG. 11 is formed.

Figure 6:
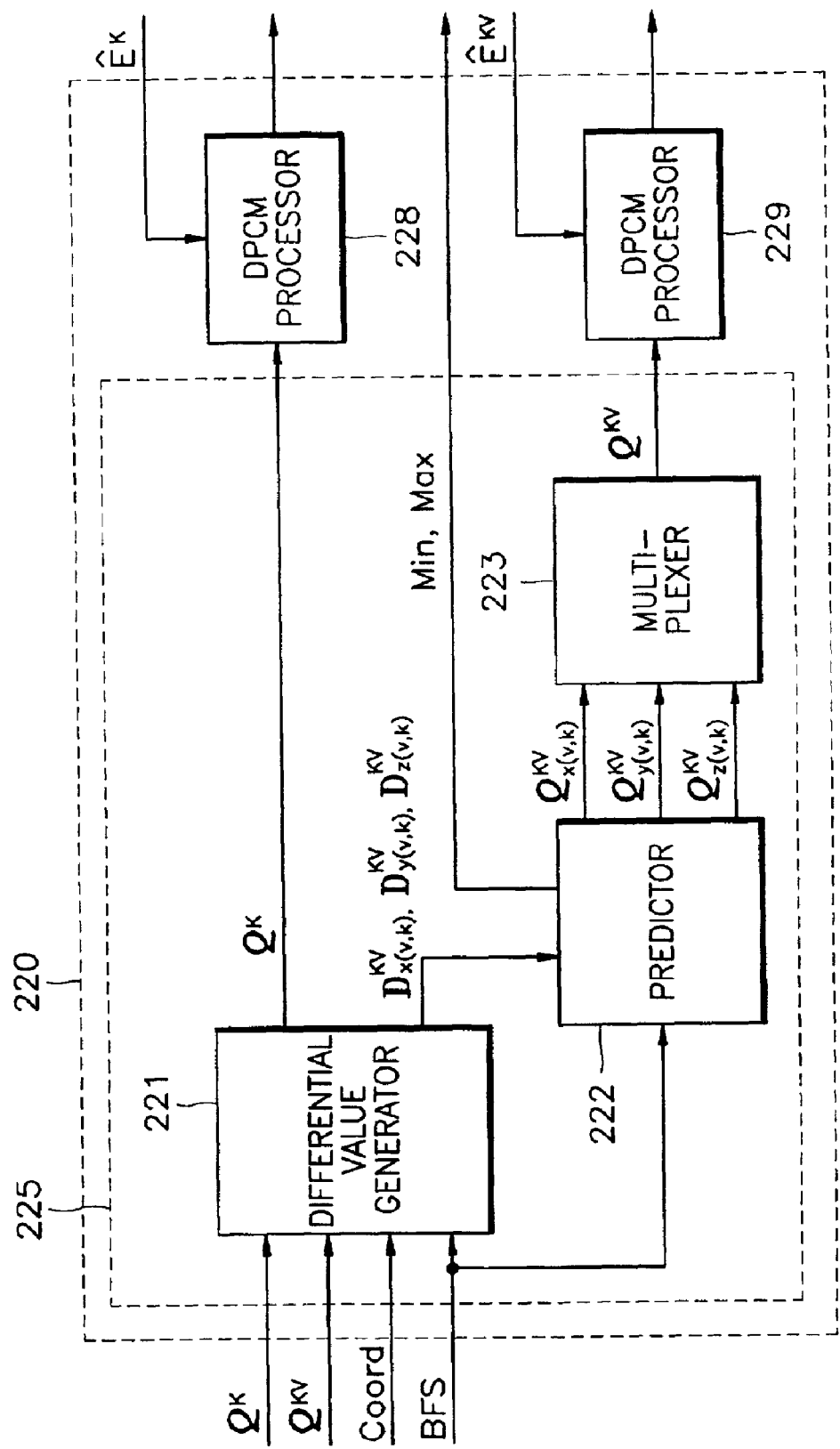
FIG. 6 is a detailed block diagram of a preferred embodiment of an Adaptive Delta Pulse Code Modulation (ADPCM) processing unit of FIG. 3.

FIG. 6 is a detailed block diagram of a preferred embodiment of the ADPCM processing unit 220 of FIG. 3. Referring to FIG. 6, the ADPCM processing unit 220 includes a differential value generator 221, a predictor 222, a multiplexer 223, a DPCM processor 228 for keys, and a DPCM processor 229 for key values. The differential value generator 221 defines differential values ($Q_{x(v,k)}^{KV}$, $Q_{y(v,k)}^{KV}$, $Q_{z(v,k)}^{KV}$) among all position values, which are obtained when an arbitrary vertex changes in time.

Figure 7:
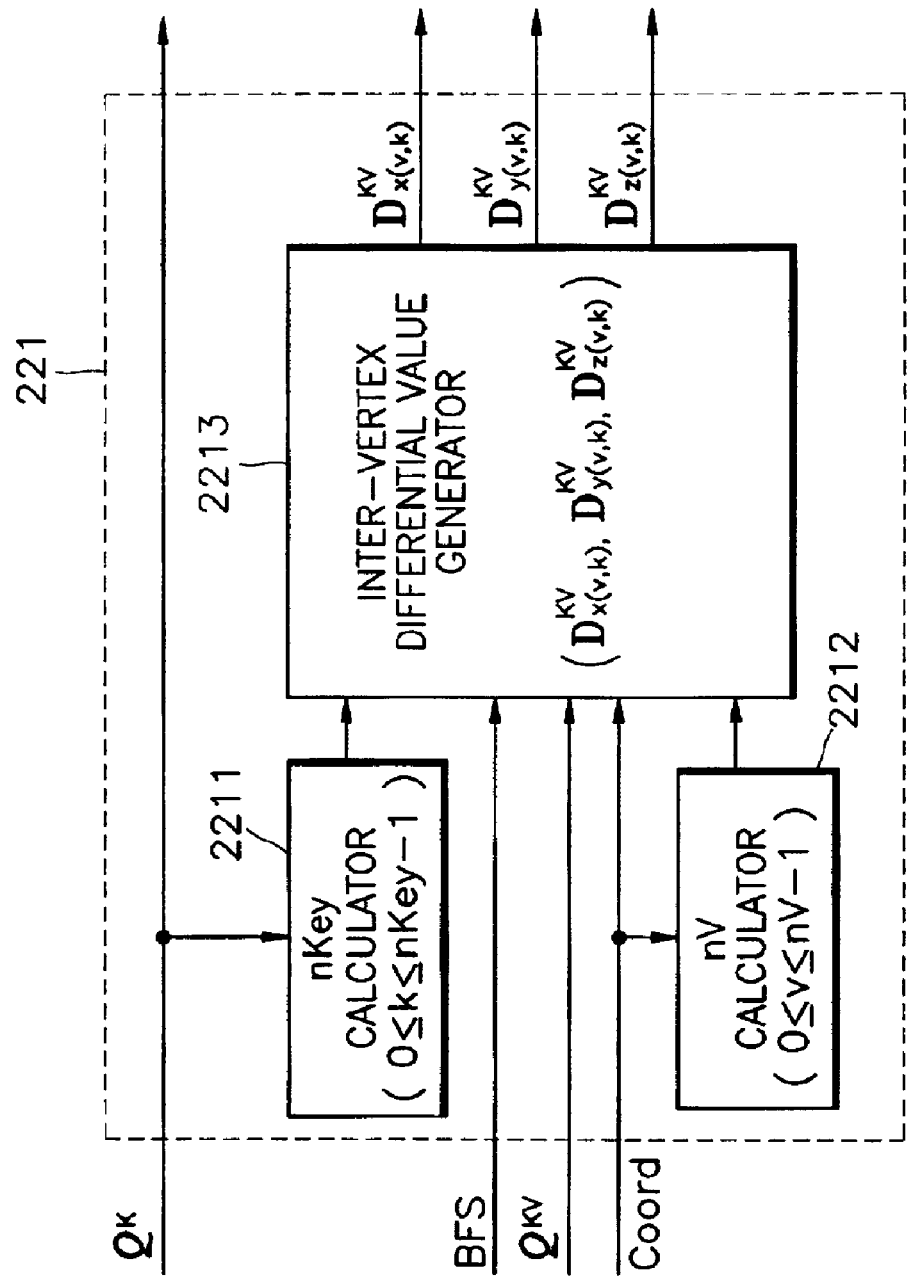
FIG. 7 is a detailed block diagram of a preferred embodiment of a differential value generator of FIG. 6.

FIG. 7 is a detailed block diagram of a preferred embodiment of the differential value generator of FIG. 6. Referring to FIG. 7, the differential value generator 221 includes a first calculator 2211, a second calculator 2212, and an inter-vertex differential value generator 2213. The first calculator 2211 calculates the number of key data items (nKey), and the second calculator 2212 calculates the total number of vertices (nV) existing in an IFS node. Using these numbers, the differential values of key values are calculated as follows.

Figure 8:
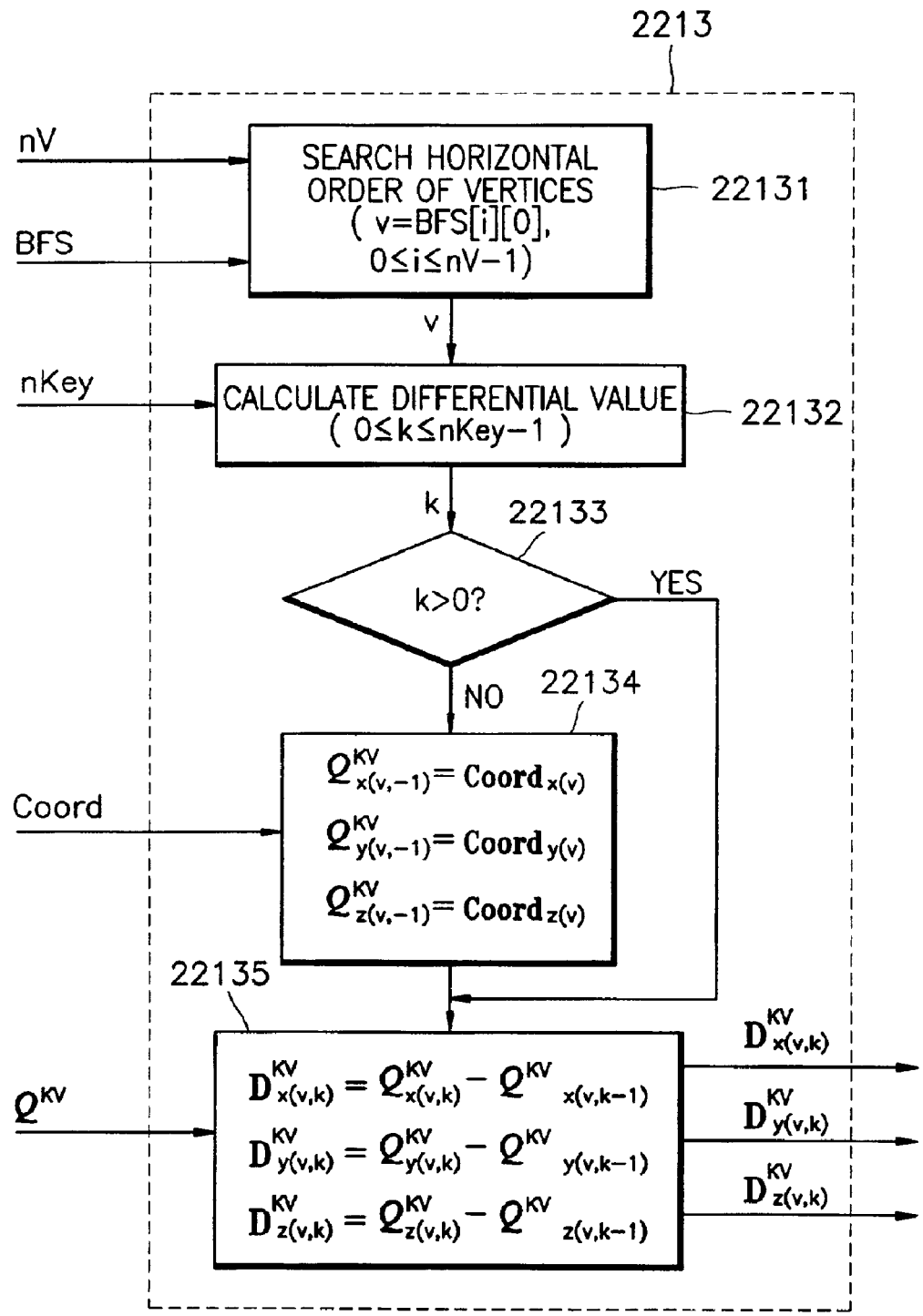
FIG. 8 illustrates a calculating method for obtaining a differential value of key values of an inter-vertex differential value generator of FIG. 7.

FIG. 8 illustrates a calculating method for obtaining a differential value of key values of the inter-vertex differential value generator of FIG. 7. Referring to FIG. 8, the inter-vertex differential value generator 2213 receives vertex forming information based on BFS information defined by the vertex connectivity processing unit 215, and defines a vertex (v) adjacent to an arbitrary i-th vertex ($0 \leq i \leq nV-1$) in step 22131. Then, in a vertex which is visited according to the BFS search order, differential values of all position values which change along a time axis in a 3D space are calculated in step 22132. In steps 22134 and 22135, differential values from which data redundancy in the time region is removed are generated. In particular, in step 22134, encoding efficiency is improved by using a key frame, which is first generated in the time axis, as a comparison value for differentiation of the vertex defined in the IFS node.

Referring to FIG. 6 again, the predictor 222 receives the differential value generated in the differential value generator 221, and extracts data redundancy due to spatial correlation among vertices forming the shape of the 3D object.

Figure 9:
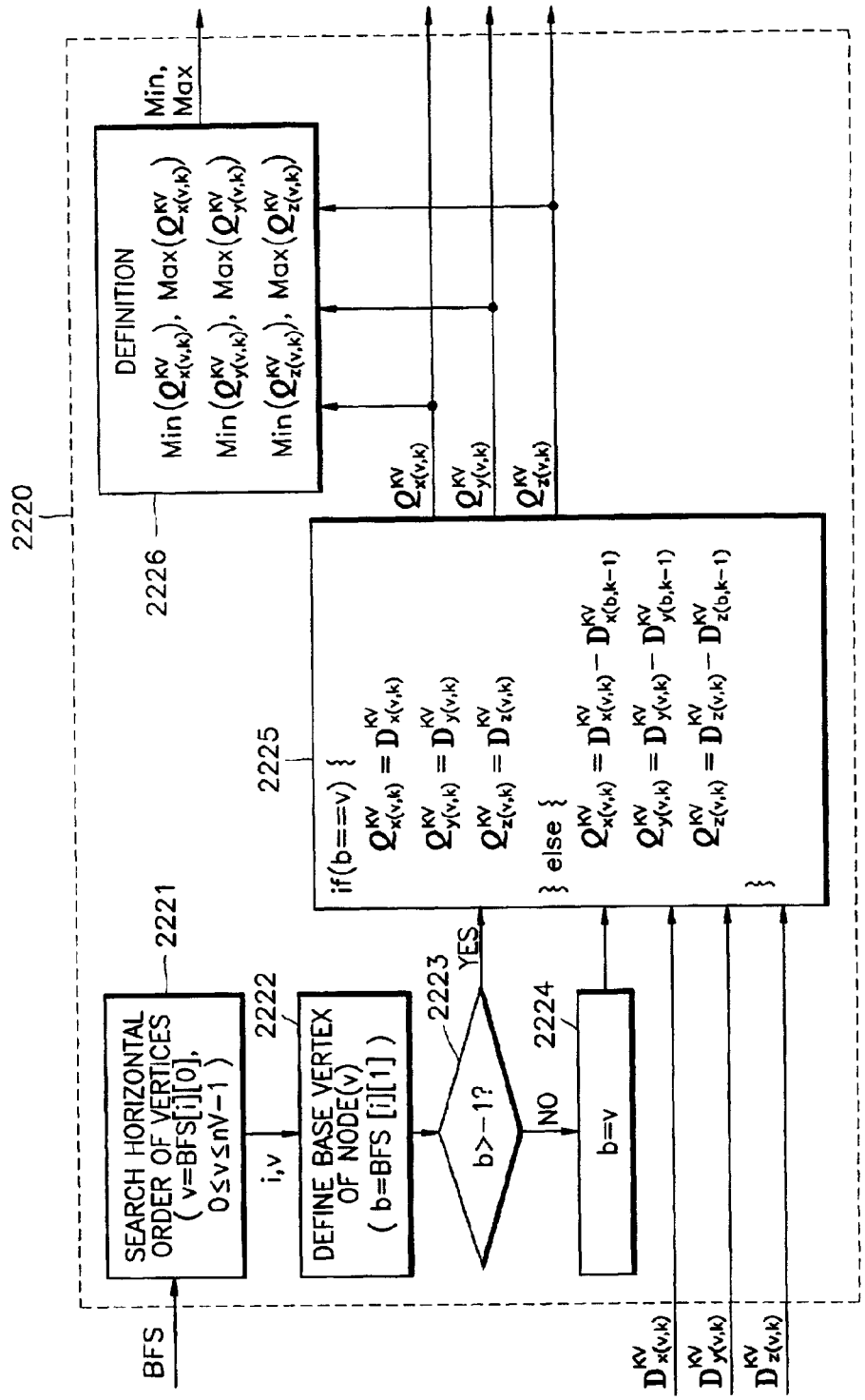
FIG. 9 illustrates a prediction method for extracting data redundancy of a predictor of FIG. 6.

FIG. 9 illustrates a prediction method for extracting data redundancy of the predictor of FIG. 6. Referring to FIG. 9, the predictor 222 first visits vertices according to the BFS search order defined in the vertex connectivity processing unit 215, and defines a vertex (v) adjacent to the visited i-Th vertex in step 2221. A vertex having high spatial correlation with the vertex (v) searched for in step 2221 is defined as a top vertex b in the BFS search order in step 2222. Then, the differential values ($Q_{x(v,k)}^{KV}$, $Q_{y(v,k)}^{KV}$, $Q_{z(v,k)}^{KV}$) of 3D space position values of two vertex b and having high spatial correlation and defined in steps 2221 and 2222, respectively, are calculated to remove spatial data redundancy in step 2225.

At this time, a differential value which is input through the differential value generator 221 is used, without change, as a vertex which is first visited according to the BFS search order. In step 2226, a maximum value and a minimum value (Max, Min) of each component are defined from the differential values ($Q_{x(v,k)}^{KV}$, $Q_{y(v,k)}^{KV}$, $Q_{z(v,k)}^{KV}$) space position values obtained in step 2225. The maximum values and minimum values are input to the quantization unit 230, and are used in a normalization process which is needed for quantization.

Thus, the differential values ($E^{KV}$) of key value data in which spatiotemporal data redundancy is to be removed are input to the DPCM processing unit 229 as shown in FIG. 6, and the DPCM processing result value is output to the quantization unit 230.

As the above-described differential values ($E^{KV}$) of key value data, keys ($E^K$) of which data redundancy is to be removed using temporal data correlation which is provided in the key framing type animation method, is provided through the DPCM processor 228 of FIG. 6. Then, the quantization unit 230 compresses the data by adjusting the expression precision degree of the data, and the entropy encoding unit 235 removes bit redundancy of the compressed data and forms a bit stream 240.

Figure 10:
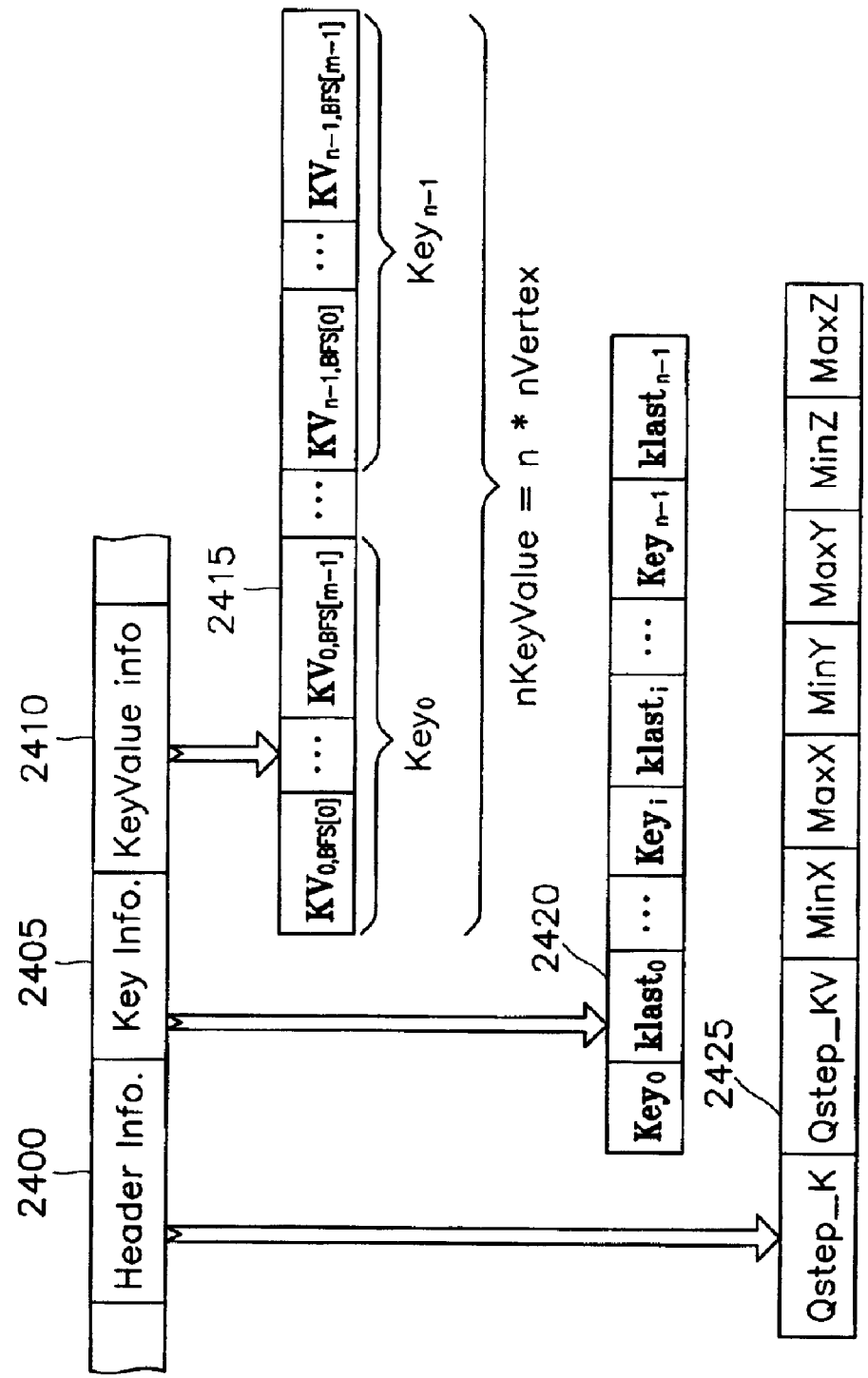
FIG. 10 is a diagram of an example of the structure of a bit stream generated by the encoding apparatus of FIG. 3.

FIG. 10 is a diagram of an example of the structure of the bit stream generated by the encoding apparatus of FIG. 3. Information items indicated by reference number 2400, 2405, and 2410 of FIG. 10 are components of the encoded bit stream of one CI node processing unit. Header information 2400 is provided as a condition of inverse quantization to be performed in the inverse quantization unit 270 in order to reconstruct the CI node in the decoding apparatus 250. As a preferable example 2425, header information 2400 is formed with the quantization size of keys (Qstep_K), the quantization size of key values (Qstep_KV), and minimum values (MinX, MinY, and MinZ) and maximum values (MaxX, MaxY, and MaxZ) which are used in normalizing differential values from the quantization unit 230 to values between 0 and 1 inclusive.

Key information 2405 provides the quantized value of key data differentiated on the time axis. Key information 2405 is formed as a preferable example 2405. Here, Klast is a 1-bit indicator for indicating the number of key data items to the decoding apparatus 250. If Klast is 0, the next data item is a key data item, and if Klast is 1, the next data item is a key value data item.

Key value information 2410 is provided as a preferred example 2415, in which position values of all vertices forming a key frame corresponding to each key sequentially occurring on the time axis are arranged in the BFS search order. Here, the arrangement of vertices in the BFS search order is for raising the correlation between bits when data is processed in the entropy encoding unit 235. Also, the arrangement of key value information items in the example 2415 in order of key is for minimizing delay time occurring until rendering the reconstruct result when the bit stream 2415 is reconstructed, and for minimizing the use of a memory of the decoding apparatus 250.

Referring to FIG. 3 again, the bit stream 240, which is generated by the above-described encoding process, may be reconstructed by the inverse of the encoding process. Here, the decoding apparatus 250 should receive the IFS node through the demultiplexer 260 in order to reconstruct the key frame of the first key of each node, and to generate BFS information expressing spatial correlation of the 3D object.

The major features of the encoding and decoding processes according to the present invention includes removal of data redundancy due to spatiotemporal correlation of the deformation information of the 3D object, and reduction of the amount of data to be encoded using the correspondence between the IFS nodes and CI nodes provided in the key framing animation method.

As described above, the encoding apparatus and method of the first preferred embodiment of the present invention of FIGS. 3 and 4 provide performances superior to that of the prior art technology in the aspect of reduction of the amount of data to be encoded. However, as described above, in encoding and decoding a 3D object formed of a plurality of parts, position changes of each reconstructed vertex due to quantization error may cause a reconstructed shape in which each part of the object is split from the other parts.

Figure 13:
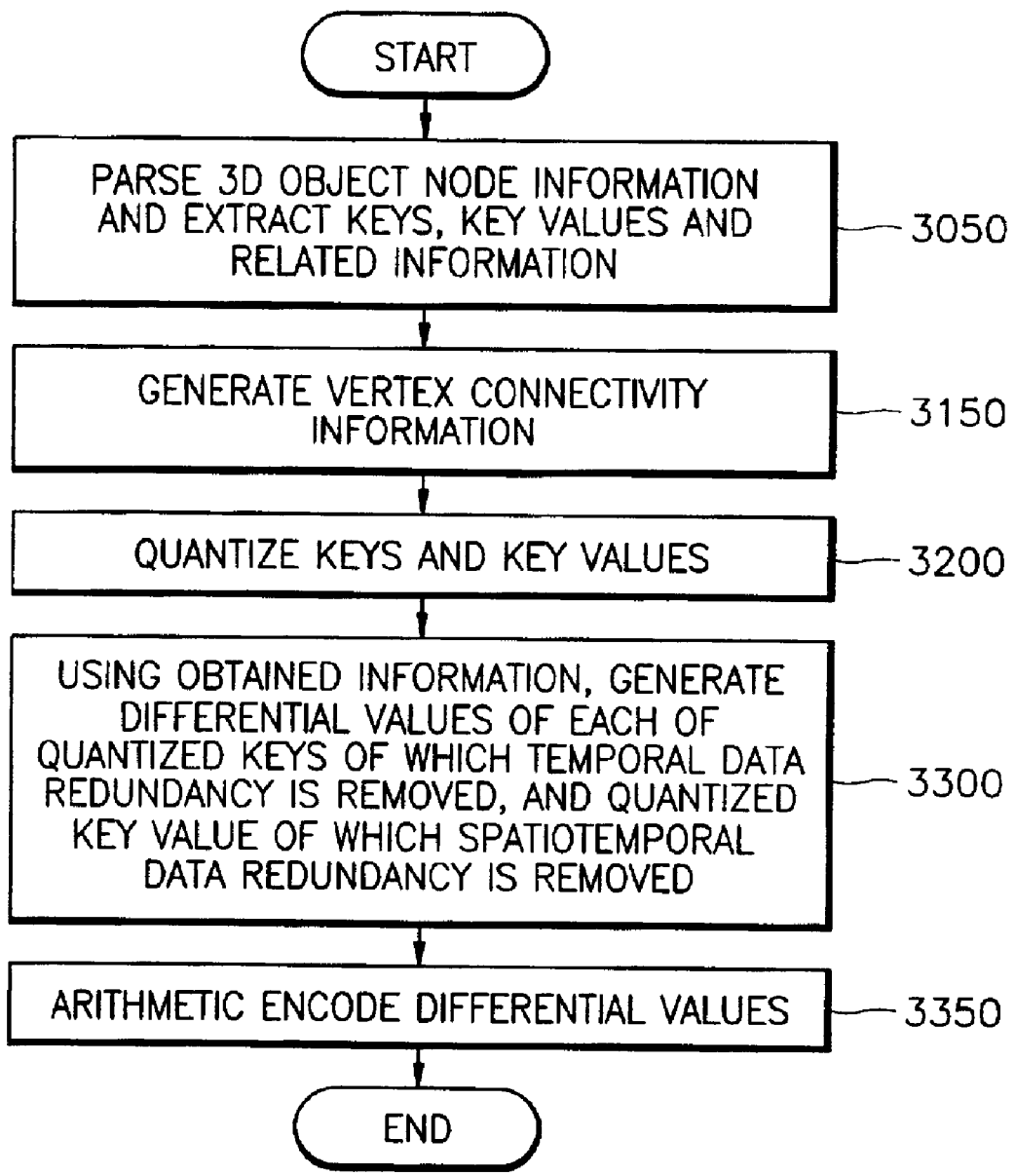
FIG. 13 is a flowchart for explaining an encoding method of the encoding apparatus of FIG. 12.

To solve this problem, in the present invention, an encoding method and apparatus for quantizing data before ADPCM processing as shown in FIGS. 12 and 13 are provided. FIG. 12 is a schematic block diagram of the encoding apparatus 300 and decoding apparatus 400 according to a second preferred embodiment of the present invention, in which quantization error is compensated for, and FIG. 13 is a flowchart for explaining the encoding method of the encoding apparatus of FIG. 12.

Referring to FIG. 12, the encoding apparatus according to the second preferred embodiment of the present invention includes a field data input unit having a parser 305 and a demultiplexer 310, a vertex connectivity processing unit 315, a quantization unit 330, an ADPCM processing unit 330, and an entropy encoding unit 335. To perform the inverse of the encoding process, the decoding apparatus 350 includes an entropy decoding unit 355, a demultiplexer 360, a vertex connectivity processing unit 365, an inverse DPCM processing unit 370, an inverse quantization unit 375, and a buffer 380. Here, the functions and structures of the parser 305, the demultiplexer 310, and the vertex connectivity processing unit 315 are the same as those of FIG. 3, and explanation thereon will be omitted.

Referring to FIG. 13, the operation of the encoding apparatus 300 will now be explained. First, the encoding apparatus 300 parses node information of a 3D object and extracts keys, key values, and related information in step 3050. Then, vertex connectivity information is generated in step 3150. Next, the quantization unit 320 receives field data formed with keys and key values of the CI node classified in the demultiplexer 310, and quantizes the data without differentiation in step 3200.

The ADPCM processing unit 330 receives field data of thus quantized keys and key values of the CI node, BFS information and Coord information, and generates differential values to remove spatiotemporal data redundancy in the field data in step 3300. In FIG. 3, the differentiation result of the ADPCM is sent to the quantization unit 230, but, unlike FIG. 3, the differentiation result of the ADPCM in FIG. 13 is sent to the entropy encoding unit 335, and then forms a final bit stream 340 in step 3350.

Figure 14:
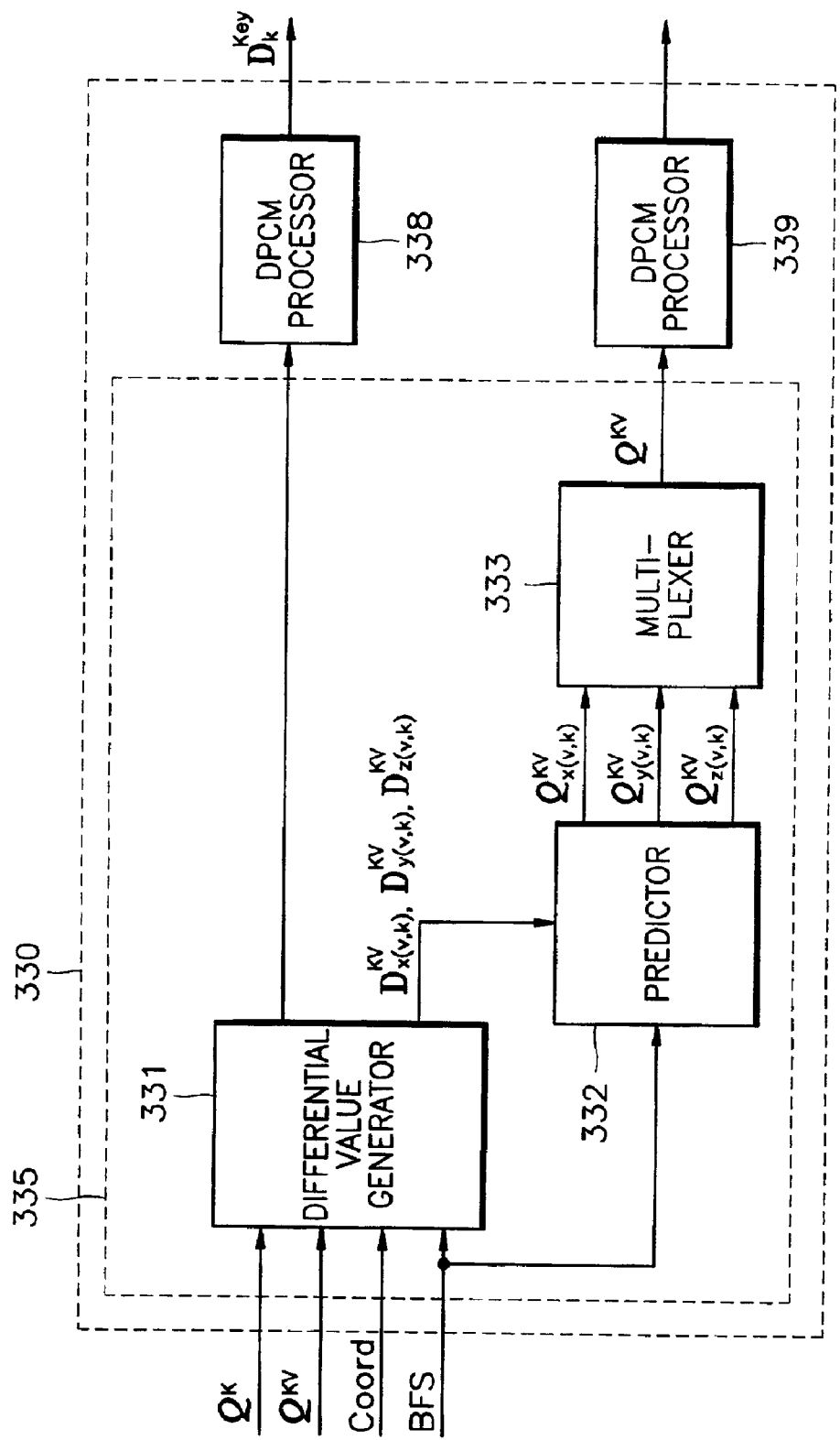
FIG. 14 is a detailed block diagram of a preferred embodiment of an ADPCM processing unit of FIG. 12.

FIG. 14 is a detailed block diagram of a preferred embodiment of the ADPCM-processing unit of FIG. 12. Compared to the ADPCM processing unit 220 of FIG. 6, the predictor 332 of the ADPCM processing unit 330 of FIG. 12 does not have the function for defining maximum values and minimum values (Max, Min) of spatial prediction differential values of each of x, y, z coordinate values of a vertex needed in quantization. Therefore, the detailed processing of the differential value calculator 331 is the same as that of FIG. 7, but the predictor 332, that is, the spatial prediction differential value generator, does not generate a maximum value and a minimum value (Max, Min) of each component which are needed in quantization, because the predictor 332 uses the data value quantized in the quantization unit 320.

Figure 15:
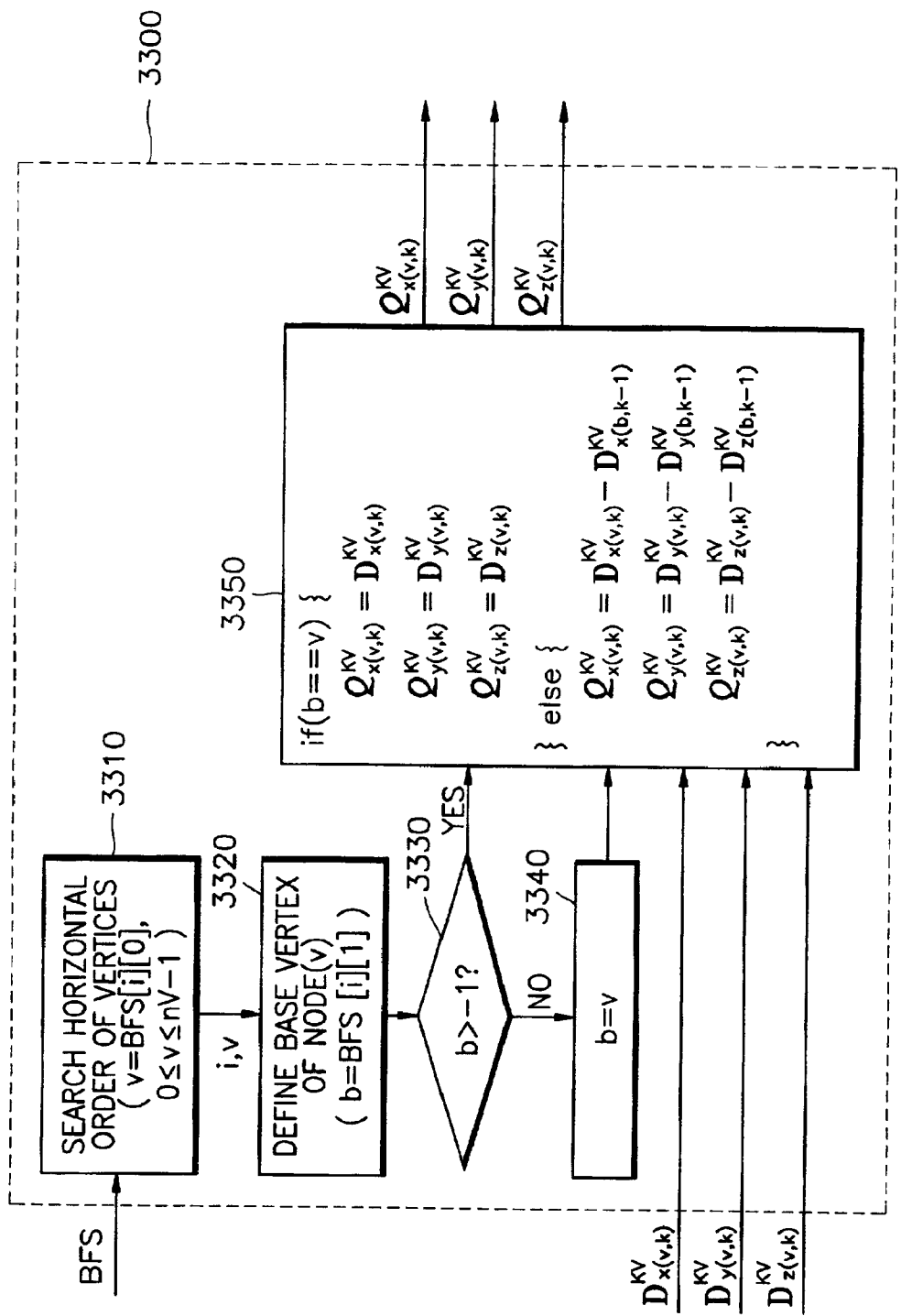
FIG. 15 illustrates a prediction method for extracting data redundancy of the predictor of FIG. 14.

FIG. 15 illustrates a prediction method for extracting data redundancy of the prediction of FIG. 14. Referring to FIG. 15, the prediction method is the same as the prediction method of FIG. 9, except 2226 step. Therefore, for brevity, the prediction method shown in FIG. 15 will be omitted.

Figure 16:
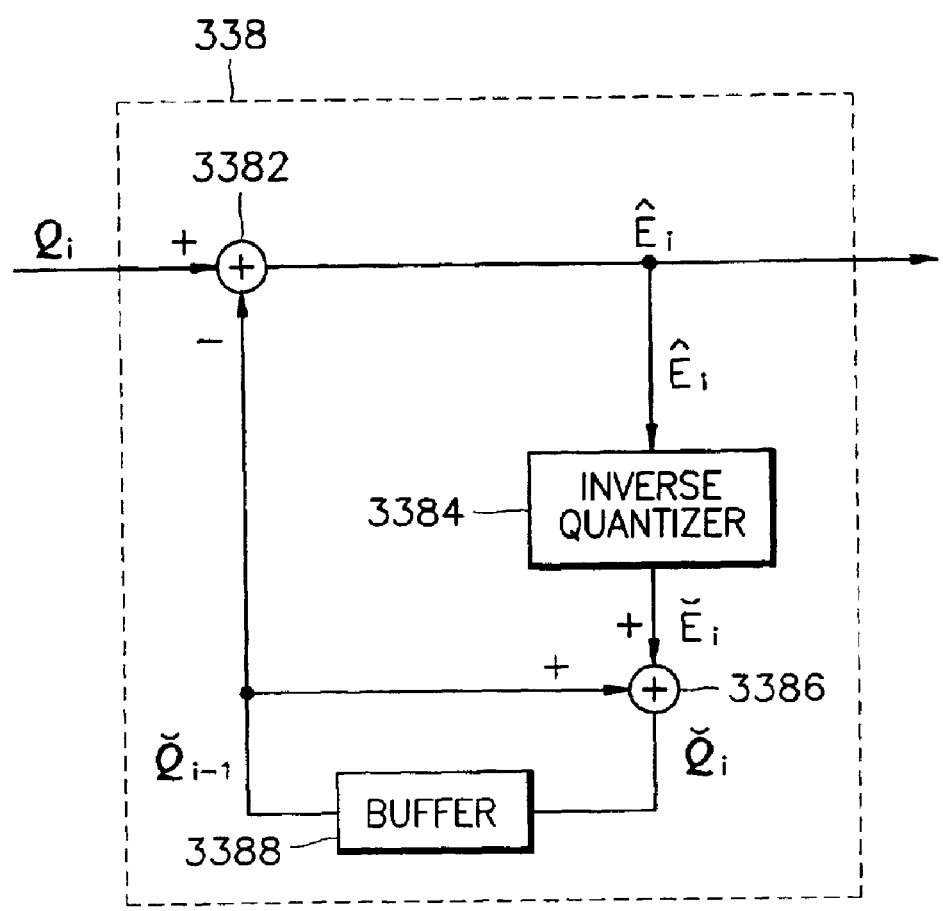

FIG. 16 is a block diagram of a preferred embodiment of the DPCM processors 338 and 339 of FIG. 14, in which quantization error is compensated for. Referring to FIG. 16, each of the DPCM processors 338 and 339 provides the DPCM result to the entropy encoding unit 335, unlike FIG. 6 where the DPCM result is sent to the quantization unit 320, and forms a final bit stream 340. At this time, the thus formed bit stream 340 has actually the same structure as shown in FIG. 10. Also, the bit stream 340 is reconstructed to the CI node in the decoding apparatus 350 of FIG. 12 through the inverse of the above-described encoding process.

Thus quantized keys and key values of the CI node before differentiation have the following effects. The position values of all vertices forming the shape of the 3D object to be encoded provide a state in which the position values already moved the same distances as quantization errors in a 3D space, and therefore do not propagate quantization errors to other neighboring vertices.

Accordingly, in a decoding process, the accumulation of quantization errors in other vertices excluding a current vertex does not occur, and therefore the split reconstruction in which each part of the object is split from the other parts is prevented when decoding the 3D object formed of a plurality of parts. At this time, compression efficiency is actually the same as in FIG. 3.

Thus, the encoding apparatuses 200 and 300 and decoding apparatuses 250 and 350 according to the first and second preferred embodiments of the present invention efficiently encode key data and key value data of CI nodes, using the vertex connectivity processing units 215, 315, 265, and 365.

Here, data which is input to the entropy processing unit is encoded as quantization bits of key values which is given in advance in entropy encoding. In this method, as encoding is performed by using spatiotemporal data correlation, the dispersion degree of data is lowered and the distribution range of data is also narrowed. Therefore, the quantization step of encoding bits of key values in entropy encoding can reduce encoding bits enough to express the distribution range of data. Accordingly, without loss of quantizing data, encoding efficiency is improved by using the needed quantization step of encoding bits, while the amount of data to be stored can be reduced.

However, in the above method, a method for selecting a start vertex in a BFS search for forming a BFS graph in encoding key value data is not considered. Therefore, a vertex of an arbitrary index, or the first index is searched first. This is a method for selecting an arbitrary vertex without considering the structure of the 3D object. Therefore, an efficient method for selecting a start vertex is needed.

Encoding apparatuses and decoding apparatuses according to a third embodiment and a fourth embodiment of the present invention, which improves the method for compressing and encoding key value data among data of CI nodes, will now be explained.

FIG. 17 is a block diagram of an encoding apparatus and decoding apparatus according to the third preferred embodiment of the present invention, having a function for generating a start node, and FIG. 18 is a block diagram of an encoding apparatus and decoding apparatus according to the fourth preferred embodiment of the present invention, in which quantization error is compensated for.

Referring to FIG. 17, the encoding apparatus according to the third embodiment of the present invention includes a field data input unit having a parser 405 and a demultiplexer 410, a start vertex generator 412, a vertex connectivity processing unit 415, an ADPCM processing unit 420, a quantization unit 430, a key value encoding bit generating unit 432, and an entropy encoding unit 435. To perform the inverse of the encoding process of the encoding apparatus 400, the decoding apparatus 450 includes an entropy decoding unit 455, a demultiplexer 460, a start vertex generator 462, a vertex connectivity processing unit 465, an inverse quantization unit 470, an inverse ADPCM processing unit 475, and a buffer 480. Here, compared to the modules of the encoding apparatus 300 of FIG. 3, the modules of the encoding apparatus 400 have the same functions and structures, excluding the start vertex generators 412 and 462, and the key value encoding bit generator 432. The encoding operations performed in the encoding apparatus 400 will now be explained.

The demultiplexer 410 receives the CI node and IFS node classified in the parser 405, and provides the nodes to the ADPCM processing unit 420 and the start vertex generator 412. The vertex connectivity processing unit 415 receives CIdx field data and start vertex information (Start) of the IFS node from the start vertex generator 412 and forms BFS information.

The ADPCM processing unit 420 receives BFS information generated in the vertex connectivity processing unit 415, and keys ($Q^K$) and key values ($Q^{KV}$) corresponding to the CI node and Coord information of the IFS node provided by the demultiplexer 410. Then, the ADPCM processing unit 420 generates each differential value ($E^K$, $E^{KV}$) of keys, of which temporal data redundancy is to be removed, and key values, of which spatiotemporal data redundancy is to be removed, to the quantization unit 430. The quantization unit 430 compresses data by adjusting the expression precision degree of key value data with respect to the quantization size value. Quantized result values ($\hat{E}^{KV}$) are input to both the ADPCM processing unit 420 and the entropy encoding unit 435. In response to the quantized result values ($\hat{E}^{KV}$), the encoding bit generating unit 432 generates the quantization steps of encoding bits (Qstep_X, Qstep_Y, Qstep_Z). The generated quantization steps of encoding bits (Qstep_X, Qstep_Y, Qstep_Z) are input to the entropy encoding unit 435. In response to the quantization steps (Qstep_X, Qstep_Y, Qstep_Z), the entropy encoding unit 435 removes bit redundancy in the quantized values ($\hat{E}^{KV}$), using the probability of bit symbol occurrence, and forms a final bit stream (Compressed Bit Stream) 440.

As described above, the encoding apparatuses 200 and 300 of FIGS. 3 and 12 start search from the vertex of an arbitrary index or the first index. Unlike these, the encoding apparatus 400 according to the third preferred embodiment of the present invention provides an efficient start vertex. That is, in starting a BFS search, the encoding apparatus 400 finds a start vertex (Start) which enables more efficient encoding, and using this, more efficiently generates a BFS graph.

However, in the encoding apparatus 400, the position values of vertices to be encoded are converted to differential values before quantizing in order to reduce data redundancy, and therefore, when differential values are quantized and reconstructed, change in the position of each reconstructed vertex may occur. This may cause split reconstruction in which each part of the object is split from other parts. To reduce the quantization error, in the present invention, the encoding apparatus 500 and decoding apparatus 550 for reducing quantization error, as shown in FIG. 18, are provided. As described above, the quantization error can be prevented by using the differential values between already quantized values. For this, the encoding apparatus 500 of FIG. 18 has an ADPCM processing unit 530 and a quantization unit 520, of which placing order is the inverse of that of the ADPCM processing unit 420 and the quantization unit 430 of FIG. 17, and the decoding apparatus 550 of FIG. 18 has an inverse ADPCM processing unit 570 and an inverse quantization unit 575, of which placing order is the inverse of that of the inverse ADPCM processing unit 475 and the inverse quantization unit 470 of FIG. 17. Also, compared to the modules of the encoding apparatus 300 and decoding apparatus 350 of FIG. 12, the modules of the encoding apparatus 500 and the decoding apparatus 550 of FIG. 18 have the same functions and structures, excluding the start vertex generators 512 and 562 and the key value encoding bit generator 532 which are included only in FIG. 18. Therefore, explanation on the same modules will be omitted.

Figure 19:
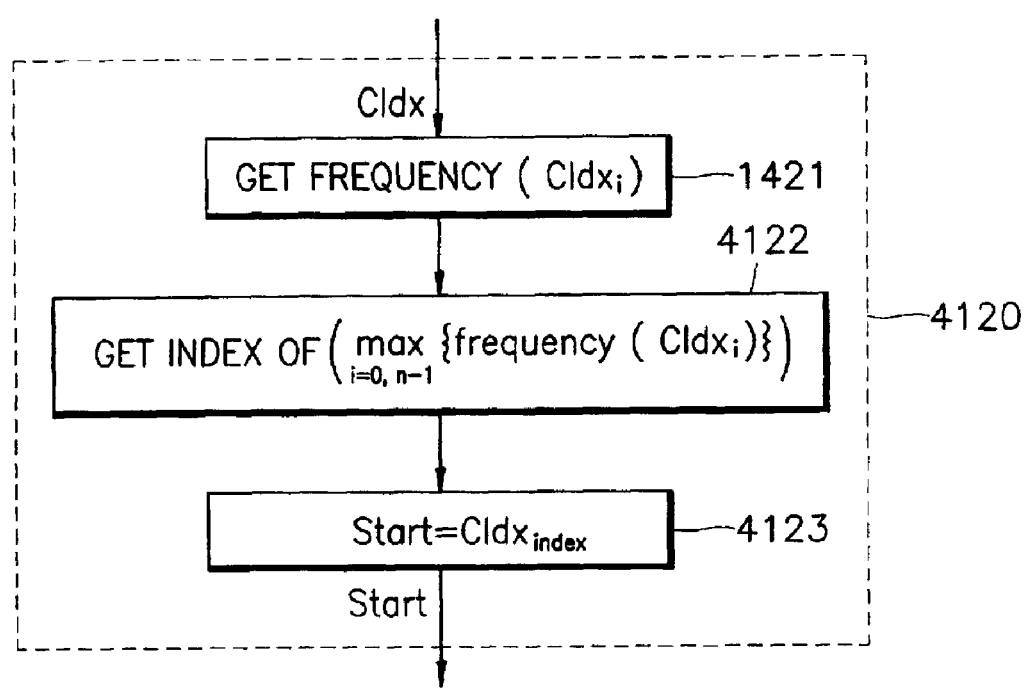
FIG. 19 is a flowchart for explaining a method for generating a search start node of a search start node generator of FIGS. 17 and 18.

FIG. 19 is a flowchart for explaining a method for generating a search start vertex of the start vertex generator of FIGS. 17 and 18. Referring to FIG. 19, each of the start vertex generators 412 and 512 first receives connectivity information among vertices (CIdx), and obtains the number of vertices (frequency($CIdx_j$)) connected to each of all vertices in step 4121, and obtains the index of a vertex which has the most connected vertices, among the vertices in step 4122. Then, the vertex of the obtained index is output as a start vertex (Start) in step 4123. This start vertex (Start) is used as the start vertex of the BFS search.

In general, neighboring vertices have similar motion vectors. The more neighboring vertices a vertex has, the more influences the vertex has on the neighboring vertices when change occurs in the vertex. Therefore, when the vertex having the greatest influences on the neighboring vertices is selected as a start vertex, the BFS search graph more efficiently generates neighboring graphs. If search is performed taking a vertex having smaller neighboring vertices as a start vertex, the search graph cannot efficiently generate neighboring graphs. Therefore, by generating a start vertex according to the method of FIG. 19, a more efficient search graph is generated.

Figure 20:
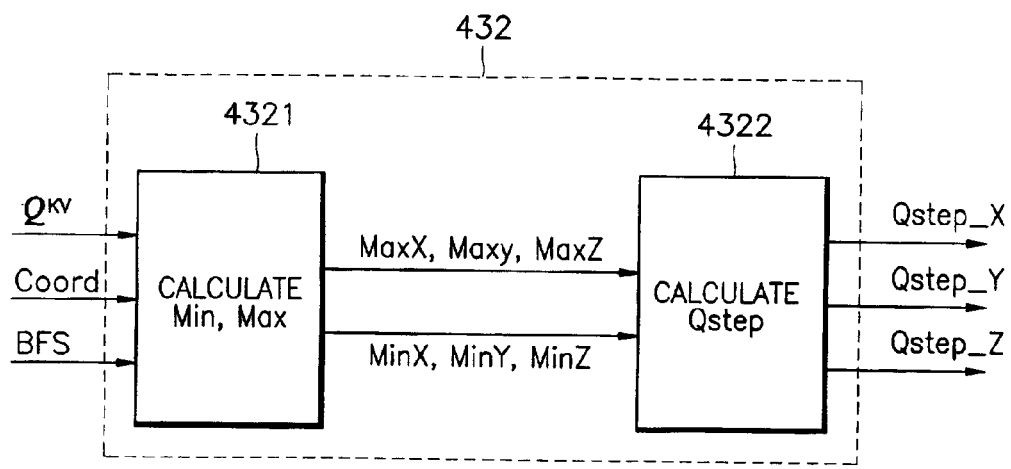
FIG. 20 is a detailed block diagram of a generating unit of the quantization steps of encoding bits of FIGS. 17 and 18.

Referring to FIG. 20, the operation of the key value quantization step generating unit 432 for generating the quantization steps of encoding bits (Qstep_X, Qstep_Y, Qstep_Z) will now be explained. FIG. 20 is a detailed block diagram of the encoding bit generating unit of FIGS. 17 and 18.

Referring to FIG. 20, the encoding bit generating unit 432 includes a maximum and minimum calculating unit (Calculate Min Max) 4321 and a quantization step generator (Calculate Qstep) 4322. The maximum and minimum calculating unit (Calculate Min Max) 4321 receives key values, Coord data that corresponds to the first key frame of the CI node, and a BFS search graph. The maximum and minimum calculating unit (Calculate Min Max) 4321 also receives a maximum value (MaxX) and a minimum value (MinX) of quantized data of X in key values, a maximum value (MaxY) and a minimum value (MinY) of quantized data of Y in key values, and a maximum value (MaxZ) and a minimum value (MinZ) of quantized data of Z in key values, and sends the maximum and minimum values to the quantization step generator 4322. The quantization step generator 4322 generates the quantization steps of encoding bits (Qstep_X, Qstep_Y, Qstep_Z) enough to express the ranges of quantized data of X, Y, Z coordinates, respectively. A method for calculating quantization steps for obtaining the quantization step of encoding bits will now be explained.

Figure 21:
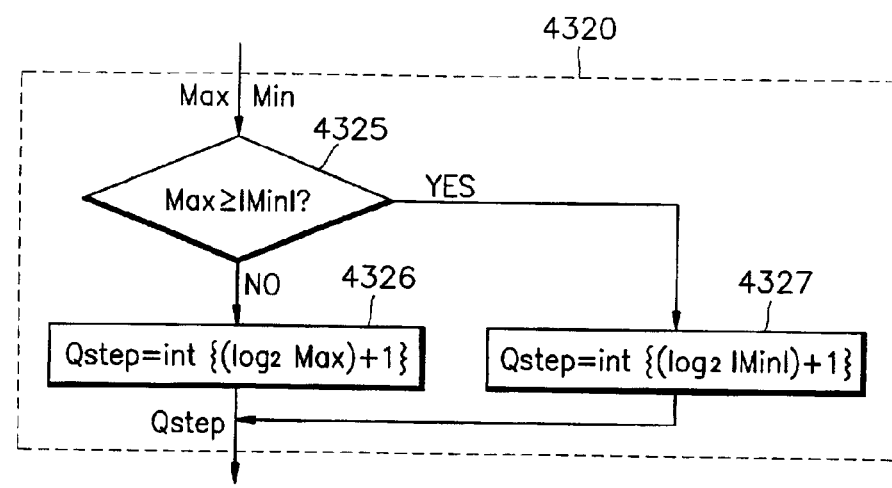
FIG. 21 is a flowchart for explaining a quantization steps calculation method which is performed by quantization steps generator of FIG. 20.

FIG. 21 is a flowchart for explaining an quantization step calculation method which is performed by the quantization step generator of FIG. 20. Referring to FIG. 21, the method for calculating quantization steps according to the present invention first receives a maximum value (MaxX) and a minimum value (MinX) of quantized data of X in key values, a maximum value (MaxY) and a minimum value (MinY) of quantized data of Y in key values, and a maximum value (MaxZ) and a minimum value (MinZ) of quantized data of Z in key values. If the maximum values (Max, that is, MaxX, MaxY, MaxZ) and minimum values (Min, that is, MinX, MinY, MinZ) are input, it is determined whether or not the absolute values of the minimum values (Min) are less than or equal to the maximum values (Max) in step 4325. If the result indicates that the minimum values (Min) are less then or equal to the maximum values (Max), the quantization steps of encoding bits (Qstep, that is, Qstep_X, Qstep_Y, Qstep_Z) are set as int$\{(\log_2 \text{Max})+1\}$ and otherwise the quantization steps of encoding bits (Qstep) are set as int$\{(\log_2|\text{Min}|)+1\}$. Thus, the quantization steps of encoding bits (Qstep_X, Qstep_Y, Qstep_Z) of quantized data of X, Y, Z coordinates are obtained, and the quantization steps of encoding bits (Qstep_X, Qstep_Y, Qstep_Z) are output from the quantization step generator 4322 of FIG. 20.

Figure 22:
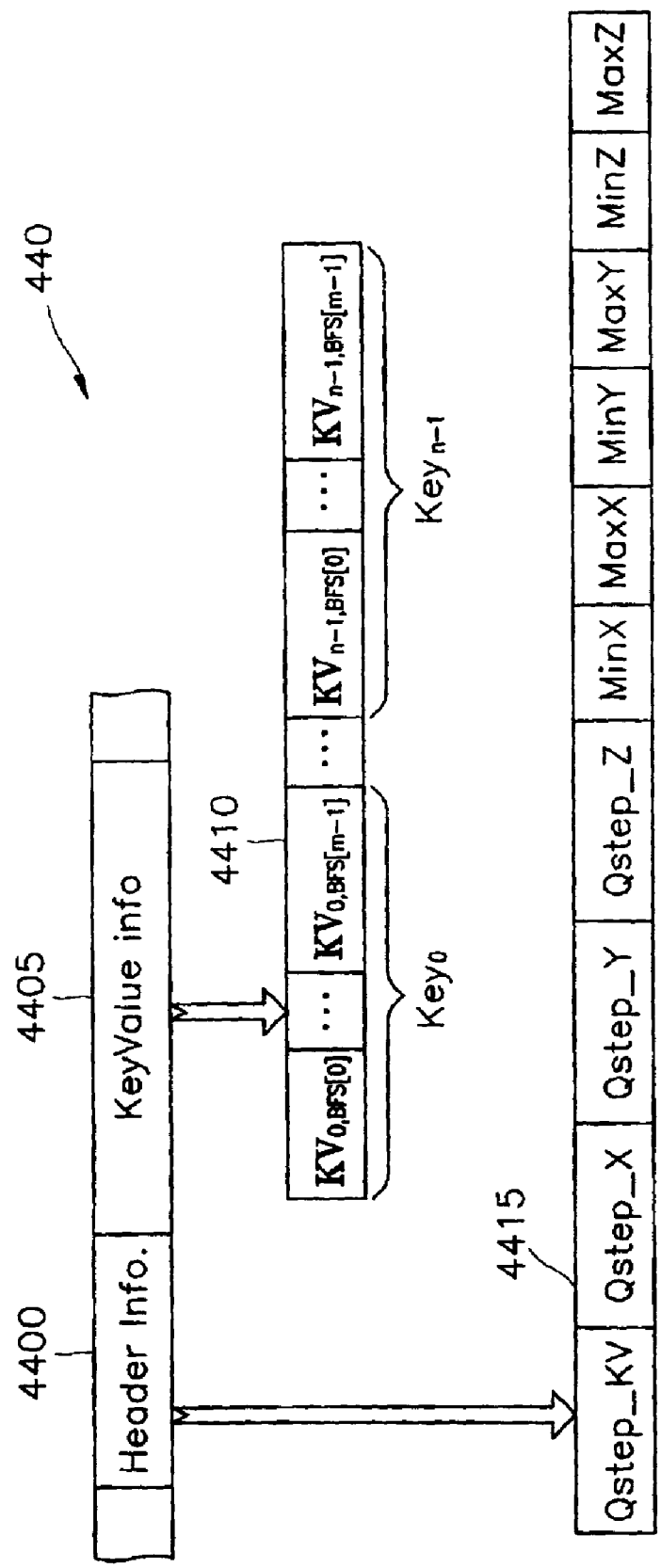
FIG. 22 is a diagram of an example of the structure of a bit stream generated by the encoding apparatuses of FIGS. 17 and 18.

FIG. 22 is a diagram of an example of the structure of a compressed bit stream generated by the encoding apparatus of FIGS. 17 and 18. Referring to FIG. 22, each of the bit streams 440 and 540 of FIGS. 17 and 18, which is finally generated by the encoding apparatus 400 and 500, includes header information 4400 and key value information 4405. Header information 4400 and key value information 4405 indicates information that is processed in one CI node. The header information 4400 is provided as a condition of inverse quantization to be performed in the inverse quantization units 475 and 575 in order to reconstruct the CI node in the decoding apparatuses 450 and 550. As a preferable example 4415, the header information 4400 is formed with the quantization size of key values (Qstep_KV), the quantization step of encoding bits of X (Qstep_X) in key values, the quantization step of encoding bits of Y (Qstep_Y) in key values, the quantization step of encoding bits of Z (Qstep_Z) in key values, and minimum values (MinX, MinY, and MinZ) and maximum values (MaxX, MaxY, and MaxZ) which are used in normalizing differential values from the quantization unit 430 to values between 0 and 1 inclusive. An example 4410 shows the structure of the key values information 4405, which includes key value information according to the BFS search order.

As described above, the bit stream which is generated by the encoding process can be reconstructed to original data by the decoding apparatuses 450 or 550 through the inverse of the encoding process. Here, in order to reconstruct the key frame of the first key in each node and to generate BFS information for expressing the spatial correlation of the 3D object as the BFS forming units 465 or 565, the decoding apparatuses 450 or 550 should receive IFS node data and the start vertex (Start) from the start vertex generators 462 or 562. The demultiplexers 460 or 560 receive IFS data and send CIdx data to the start vertex generators 462 or 562.

As described above, in encoding deformation information of a 3D object to be encoded with respect to time, the present invention removes data redundancy by using spatiotemporal correlation, so as to provide more efficient data compression. Also, by finding a start vertex appropriate for generating an efficient BFS search graph in encoding key values, and using the start vertex, the quantization step of encoding bits are adjusted to quantized data and encoding is performed. Therefore, key values of the CI node is efficiently encoded. In addition, by compensating for quantization error, quantization errors are not accumulated in vertices, excluding corresponding vertex itself. Therefore, in decoding the encoded 3D object formed of a plurality of parts, the split reconstruction in which each part of the object is split from other parts is prevented. Therefore, in a 3D object which is expressed by a polygonal mesh, or parametric mesh, a huge amount of key value information of 3D graphic animation data which is provided as deformation information of the 3D object with the lapse of time can be efficiently compressed, encoded, and decoded.

What is claimed is:

1. An encoding method of deformation information of a 3-Dimensional (3D) object, in which information on vertices forming the shape of the 3D object is described by a key framing method for performing deformation of the 3D object, the encoding method comprising steps of:

(a) extracting keys indicating positions of key frames on a time axis, key values indicating characteristics information of key frames, and relation information, by parsing node information of the 3D object;

(b) generating vertex connectivity information from the related information;

(c) generating differential values for each of the keys from which temporal data redundancy is to be removed, and key values from which spatiotemporal data redundancy is to be removed, based on the vertex connectivity information;

(d) quantizing the differential values; and (e) removing redundancy among bits and generating compressed bit stream through entropy encoding, by receiving the quantized keys and key values.

2. The encoding method of claim 1, wherein in step (a) node information is divided into a Coordinate Interpolator (CI) node and an IndexFaceSet (IFS) node, and field data formed with keys and key values are extracted from the CI node and Coordinate Index (CIdx) field data is extracted from the IFS node.

3. The encoding method of claim 2, wherein in step (b) the CIdx field data extracted from the IFS node is received as the related information and Breadth First Search (BFS) information for defining spatial data correlation among vertices is formed as the vertex connectivity information.

4. The encoding method of claim 3, wherein in step (b) the CIdx field data is received and stored in a queue for each vertex, and the BFS information is generated based on whether or not each vertex is visited through the queue.

5. The encoding method of claim 1, wherein the step (c) further comprises the steps of:
  (c1) receiving the vertex connectivity information, coordinate information of the IFS node as the related information, and key values, and generating differential values among all position values of the key values change in a 3D space;
  (c2) extracting data redundancy in the differential values according to the spatial correlation among vertices based on the vertex connectivity information; and
  (c3) Differential Pulse Code Modulation (DPCM) processing each of the keys extracted in step (a), and key values of which data redundancy due to the spatial correlation is extracted.

6. The encoding method of claim 5, wherein the number of key data items to be encoded and the total number of vertices in the IFS parsed from the node information as the related information are calculated and using the result of the calculation, differential values of key values are calculated.

7. The encoding method of claim 5, wherein in step (c2) vertices are visited according to the search order of the vertex connectivity information, vertices adjacent to a visited vertex are defined, a vertex having high spatial correlation with the visited vertex is defined as a top vertex, the differential value of the 3D space position values of the two vertices is calculated, and the data redundancy is removed.

8. The encoding method of claim 1 wherein in the step (e) redundancy among bits is removed with respect to the probability of symbol occurrence.

9. The encoding method of claim 8, wherein a bit stream obtained the encoding method is formed at least with encoded key information and key value information, the key information is formed with a combination of the keys and key indicators for the keys, the key value information is arranged in order of key in a key frame, and key frames are formed according to the search order of the vertex connectivity information.

10. An encoding method of deformation information of a 3-Dimensional (3D) object, in which information on vertices forming the shape of the 3D object is described by a key framing method for performing deformation of the 3D object, the encoding method comprising steps of:
  (a) extracting keys indicating position of key frames on a time axis, key values indicating characteristics information of key frames, and relation information, by parsing node information of the 3D object;
  (b) generating vertex connectivity information from the related information;
  (c) quantizing the keys and key values;
  (d) generating differential values of each of keys of which temporal data redundancy is to be removed, and quantized key values of which spatiotemporal data redundancy is to be removed, based on the vertex connectivity information; and
  (e) removing redundancy among bits and generating compressed bit stream through entropy encoding, by receiving the differential values.

11. The encoding method of claim 10, wherein in step (a) node information is divided to a Coordinate Interpolator (CI) node and an IndexFaceSet (IFS) node, and field data formed with keys and key values are extracted from the CI node and Coordinate Index (CIdx) field data is extracted from the IFS node.

12. The encoding method of claim 10, wherein in step (b) the CIdx field data extracted from the IFS node is received as the related information and Breadth First Search (BFS) information for defining spatial data correlation among vertices is formed as the vertex connectivity information.

13. The encoding method of claim 12, wherein in step (b) the CIdx field data is received and stored in a queue for each vertex, and the BFS information is generated based on whether or not each vertex is visited through the queue.

14. The encoding method of claim 10, wherein the step (d) further comprises the steps of:
  (d1) receiving the vertex connectivity information, coordinate information of the IFS node as the related information, and key values, and generating differential values among all position values of the key values change in a 3D space;
  (d2) extracting data redundancy in the differential values according to the spatial correlation among vertices based on the vertex connectivity information; and
  (d3) Differential Pulse Code Modulation (DPCM) processing each of the keys extracted in step (a), and key values of which data redundancy due to the spatial correlation is extracted.

15. The encoding method of claim 10, wherein a bit stream obtained the encoding method is formed at least with encoded key information and key value information, the key information is formed with a combination of the keys and the key indicators for keys, the key value information is arranged in order of key in a key frame, and key frames are formed according to the search order of the vertex connectivity information.

16. An encoding method of deformation information of a 3-Dimensional (3D) object, in which information on vertices forming the shape of the 3D object is encoded by a key framing method for performing deformation of the 3D object, the encoding method comprising steps of:
  (a) extracting keys indicating position of key frames on a time axis, key values indicating characteristics information of key frames, and relation information, by parsing node information of the 3D object;
  (b) generating search start information of a Breadth First Search (BFS) for defining spatial data correlation among vertices of the 3D object;
  (c) generating vertex connectivity information from the related information extracted in step (a) and the search start information generated in step (b);
  (d) generating differential values of each key from which temporal data redundancy is removed, and key values from which spatiotemporal data redundancy is removed, based on the vertex connectivity information;
  (e) quantizing the differential values;
  (f) receiving the quantized keys and key values, and generating the quantization step of encoding bits of the key values; and (g) receiving the quantization steps of encoding bits and removing redundancy among bits in the quantized values.

17. The encoding method of claim 16, wherein in step (a) node information is divided into a Coordinate Interpolator (CI) node and an IndexFaceSet (IFS) node, and field data formed with keys and key values is extracted from the CI node and Coordinate Index (CIdx) field data is extracted from the IFS node.

18. The encoding method of claim 16, wherein step (b) comprises the steps of:
(b1) obtaining the number of vertices connected to each of the vertices in response to connection information among vertices to be encoded;
(b2) obtaining the index of a vertex which has the largest number of connected vertices among the numbers of vertices; and
(b3) generating the vertex of the obtained index as the search start information.

19. The encoding method of claim 16, wherein step (f) comprises the steps of:
(f1) comparing a maximum value and a minimum value for each of the X, Y, and Z coordinates forming the quantized key values;
(f2) if the absolute value of the minimum value is less than or equal to the maximum value in each of the X, Y, and Z coordinates, outputting the quantization step of encoding bits as $\text{int}\{(\log_2 \text{Max})+1\}$;
(f3) if the absolute value of the minimum value is greater than the maximum value in each of the X, Y, and Z coordinates, outputting the quantization step of encoding bits as $\text{int}\{(\log_2|\text{Min}|)+1\}$.

20. The encoding method of claim 16, wherein in step (g) redundancy among bits is removed with respect to the probability of symbol occurrence.

21. The encoding method of claim 16, wherein the bit stream obtained by the encoding method comprises:
header information having the quantization size of the key values, the quantization step of encoding bits of X coordinates of the key values, the quantization step of encoding bits of Y coordinates of the key values, the quantization step of encoding bits of Z coordinates of the key values, the minimum values and maximum values which are used in normalizing differential values from the quantized keys and key values and values between 0 and 1 inclusive; and
key value information according to the BFS search order.

22. An encoding method of deformation information of a 3-Dimensional (3D) object, in which information on vertices forming the shape of the 3D object is encoded by a key framing method for performing deformation of the 3D object, the encoding method comprising steps of:
(a) extracting keys indicating position of key frames on a time axis, key values indicating characteristics information of key frames, and relation information, by parsing node information of the 3D object;
(b) generating search start information of a Breadth First Search (BFS) for defining spatial data correlation among vertices of the 3D object;
(c) generating vertex connectivity information from the related information extracted in step (a) and the search start information generated in step (b);
(d) quantizing the keys and key values;
(e) generating differential values of each of quantized keys of which temporal data redundancy is removed, and quantized key values of which spatiotemporal data redundancy is removed, based on the vertex connectivity information;
(f) receiving the differential values and generating the quantization steps of encoding bits of the key values; and
(g) receiving the quantization steps of encoding bits and removing redundancy among bits in the quantized values.

23. The encoding method of claim 22, wherein in step (a) node information is divided to a Coordinate Interpolator (CI) node and an IndexFaceSet (IFS) node, and field data formed with keys and key values are extracted from the CI node and Coordinate Index (CIdx) field data is extracted from the IFS node.

24. The encoding method of claim 22, wherein step (b) comprises the steps of:
(b1) obtaining the numbers of vertices connected to each of the vertices in response to connection information among vertices to be encoded;
(b2) obtaining the index of a vertex which has the largest number of connected vertices among the numbers of vertices; and
(b3) generating the vertex of the obtained index as the search start information.

25. The encoding method of claim 22, wherein step (f) comprises the steps of:
(f1) comparing a maximum value and a minimum value for each of the X, Y, and Z coordinates forming the quantized key values;
(f2) if the absolute value of the minimum value is less than or equal to the maximum value in each of the X, Y, and Z coordinates, outputting the quantization step of encoding bits as $\text{int}\{(\log_2 \text{Max})+1\}$;
(f3) if the absolute value of the minimum value is greater than the maximum value in each of the X, Y, and Z coordinates, outputting the quantization step of encoding bits as $\text{int}\{(\log_2|\text{Min}|)+1\}$.

26. The encoding method of claim 22, wherein in step (g) redundancy among bits is removed with respect to the probability of symbol occurrence.

27. The encoding method of claim 22, wherein the bit stream obtained by the encoding method comprises:
header information having the quantization size of the key values, the quantization step of encoding bits of X coordinates of the key values, the quantization step of encoding bits of Y coordinates of the key values, the quantization step of encoding bits of Z coordinates of the key values, the minimum values and maximum values which are used in normalizing differential values from the quantized keys and key values to values between 0 and 1 inclusive; and
key value information according to the BFS search order.

28. An encoding apparatus of deformation information of a 3-Dimensional (3D) object, in which information on vertices forming the shape of the 3D object is encoded by a key framing method for performing deformation of the 3D object, the encoding apparatus comprising:
a field data input unit for extracting keys indicating position of key frames on a time axis, key values indicating characteristics information of key frames, and relation information, by parsing node information of the 3D object;
a vertex connectivity processing unit for generating vertex connectivity information from the related information;

an Adaptive Differential Pulse Code Modulation (ADPCM) processing unit for generating differential values for each of the keys from which temporal data redundancy is removed, and key values from which spatiotemporal data redundancy is removed, based on the related information and the vertex connectivity information;

a quantization unit for quantizing the differential values and outputting the quantized values; and an entropy encoding unit for receiving the quantized keys and key values and removing redundancy among bits.

29. An encoding apparatus of deformation information of a 3-Dimensional (3D) object, in which information on vertices forming the shape of the 3D object is encoded by a key framing method for performing deformation of the 3D object, the encoding apparatus comprising:

a field data input unit for extracting keys indicating position of key frames on a time axis, key values indicating characteristics information of key frames, and relation information, by parsing node information of the 3D object;

a quantization unit for quantizing the keys and key values;

an Adaptive Differential Pulse Code Modulation (ADPCM) processing unit for generating differential values of the quantized keys from which temporal data redundancy is removed, and differential values of the quantized key values from which spatiotemporal data redundancy is removed, based on the related information and the vertex connectivity information;

an entropy encoding unit for removing redundancy among bits.

30. The encoding apparatus of claim 28, wherein
the field data input unit comprises:

a parse for dividing node information into a Coordinate Interpolator (CI) node and an IndexFaceSet (IFS) node; and a demultiplexer for extracting field data formed with keys and key values from the CI node, and extracting Coordinate Index (CIdx) field data from the IFS node.

31. The encoding apparatus of claim 30, wherein the vertex connectivity processing unit receives the CIdx field data extracted from the IFS node as the related information and forms Breadth First Search (BFS) information for defining spatial data correlation among vertices as the vertex connectivity information.

32. The encoding apparatus of claim 31, wherein the vertex connectivity processing unit receives the CIdx field data, stores the CIdx field data in a queue for each vertex, and generates the BFS information based on whether or not each vertex is visited through the queue.

33. The encoding apparatus of claim 28, wherein the ADPCM processing unit comprises:

a differential value generator for receiving the vertex connectivity information, coordinate information of the IFS node as the related information, and key values, and generating differential values among all position values of the key values change in a 3D space;

a predictor for extracting data redundancy in the differential values according to the spatial correlation among vertices based on the vertex connectivity information; and Differential Pulse Code Modulation (DPCM) processors for DPCM processing each of keys, and key values of which data redundancy due to the spatial correlation is extracted.

34. The encoding apparatus of claim 28, wherein the entropy encoding unit generates a bit stream from which redundancy among bits in the quantized values is removed using the probability of bit symbol occurrence.

35. The encoding apparatus of claim 34, wherein the bit stream is formed at least with encoded key information and key value information, the key information is formed with a combination of the keys and key indicators for the keys, the key value information is arranged in order of key in a key frame, and key frames are formed according to the search order of the vertex connectivity information.

36. An encoding apparatus of deformation information of a 3-Dimensional (3D) object, in which information on vertices forming the shape of the 3D object is encoded by a key framing method for performing deformation of the 3D object, the encoding apparatus comprises:

a field data input unit for extracting keys indicating position of key frames on a time axis, key values indicating characteristics information of key frames, and relation information, by parsing node information of the 3D object;

a vertex connectivity processing unit for generating vertex connectivity information from the related information;

a start vertex generator for determining a start vertex of the vertex connectivity information from the related information;

an Adaptive Differential Pulse Code Modulation (ADPCM) processing unit for generating differential values of each of keys of which temporal data redundancy is removed, and key values of which spatiotemporal data redundancy is removed, based on the vertex connectivity information;

a quantization unit for quantizing the differential values;

a quantization step generating unit for receiving the quantized keys and key values, and generating the quantization steps of encoding bits of X, Y, and Z coordinates of the quantized key values; and an entropy processing unit for receiving the quantization steps of encoding bits of the X, Y, and Z coordinates, and removing redundancy among bits in the quantized values.

37. An encoding apparatus of deformation information of a 3-Dimensional (3D) object, in which information on vertices forming the shape of the 3D object is encoded by a key framing method for performing deformation of the 3D object, the encoding apparatus comprising:

a field data input unit for extracting keys indicating position of key frames on a time axis, key values indicating characteristics information of key frames, and relation information, by parsing node information of the 3D object;

a vertex connectivity processing unit for generating vertex connectivity information from the related information;

a start vertex generator for determining a start vertex of the vertex connectivity information from the related information;

a quantization unit for quantizing the keys and key values;

an Adaptive Differential Pulse Code Modulation (ADPCM) processing unit for generating differential values of the quantized keys of which temporal data redundancy is removed, and differential values of the quantized key values of which spatiotemporal data redundancy is removed, based on the vertex connectivity information;

a quantization step generating unit for generating the quantization steps of encoding bits of X, Y, and Z coordinates of the differentiated key values; and an entropy processing unit for receiving the quantization steps of encoding bits of the X, Y, and Z coordinates, and removing redundancy among bits in the quantized values.

38. The encoding apparatus of claim 36, wherein the field data input unit comprises:

a parse for dividing node information into a Coordinate Interpolator (CI) node and an IndexFaceSet (IFS) node; and a demultiplexer for extracting field data formed with keys and key values from the CI node, and extracting Coordinate Index (CIdx) field data from the IFS node.

39. The encoding apparatus of claim 38, wherein the start vertex generator obtains the index of a vertex which has the largest number of connected vertices among the numbers of vertices connected to each of all vertices in response to the CIdx field data, and generates the vertex of the obtained index as the start vertex.

40. The encoding apparatus of claim 38, wherein the vertex connectivity processing unit receives the CIdx field data extracted from the IFS node as the related information, forms Breadth First Search (BFS) information for defining spatial data correlation among vertices as the vertex connectivity information, receives the start vertex information generated by the start vertex generator and generates BFS information by which search is performed from the start vertex.

41. The encoding apparatus of claim 38, wherein the quantization step generating unit comprises:

a maximum and minimum calculating unit for receiving the key values, data corresponding to the first key frame of the CI node, and the vertex connectivity information, and outputting maximum values and minimum values of the X, Y, and Z coordinates of the key values; and a quantization step generator for generating the quantization steps of encoding bits enough to express the ranges of quantized data corresponding to the X, Y, and Z coordinates.

42. The encoding apparatus of claim 41, wherein the quantization step generator compares the maximum value and the minimum value of each of X, Y, and Z coordinates data items input from the maximum and minimum calculating unit, and if the absolute value of the minimum value is less than or equal to the maximum value, outputs the quantization step of encoding bits as $int\{(\log_2 Max)+1\}$; and if the absolute value of the minimum value is greater than the maximum value, outputs the quantization step of encoding bits as $int\{(\log_2|Min|)+1\}$.

43. The encoding apparatus of claim 36, wherein the entropy processing unit removes the redundancy among bits in the quantized values, using the probability of bit symbol occurrence, and outputs the result as a bit stream.

44. The encoding apparatus of claim 43, wherein the bit stream comprises:

header information having the quantization size of the key values, the quantization step of encoding bits of X coordinates of the key values, the quantization step of encoding bits of Y coordinates of the key values, the quantization step of encoding bits of Z coordinates of the key values, the minimum values and maximum values which are used in normalizing differential values from the quantizing unit to values between 0 and 1 inclusive; and key value information according to the BFS search order.

45. The encoding apparatus of claim 29, wherein the field data input unit comprises:

a parse for dividing node information into a Coordinate Interpolator (CI) node and an IndexFaceSet (IFS) node; and a demultiplexer for extracting field data formed with keys and key values from the CI node, and extracting Coordinate Index (CIdx) field data from the IFS node.

46. The encoding apparatus of claim 29, wherein the ADPCM processing unit comprises:

a differential value generator for receiving the vertex connectivity information, coordinate information of the IFS node as the related information, and key values, and generating differential values among all position values of the key values change in a 3D space;

a predictor for extracting data redundancy in the differential values according to the spatial correlation among vertices based on the vertex connectivity information; and Differential Pulse Code Modulation (DPCM) processors for DPCM processing each of keys, and key values of which data redundancy due to the spatial correlation is extracted.

47. The encoding apparatus of claim 29, wherein the entropy encoding unit generates a bit stream from which redundancy among bits in the quantized values is removed using the probability of bit symbol occurrence.

48. The encoding apparatus of claim 37, wherein the field data input unit comprises:

a parse for dividing node information into a Coordinate Interpolator (CI) node and an IndexFaceSet (IFS) node; and a demultiplexer for extracting field data formed with keys and key values from the CI node, and extracting Coordinate Index (CIdx) field data from the IFS node.

49. The encoding apparatus of claim 37, wherein the entropy processing unit removes the redundancy among bits in the quantized values, using the probability of bit symbol occurrence, and outputs the result as a bit stream.

* * * * *